(12) United States Patent
Makino et al.

(10) Patent No.: US 9,810,877 B2
(45) Date of Patent: Nov. 7, 2017

(54) IMAGING LENS SYSTEM AND IMAGING DEVICE

(71) Applicant: HITACHI MAXELL, LTD., Ibaraki-shi, Osaka (JP)

(72) Inventors: Yutaka Makino, Ibaraki (JP); Takashi Sugiyama, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 15/022,117

(22) PCT Filed: Oct. 3, 2014

(86) PCT No.: PCT/JP2014/005050
§ 371 (c)(1),
(2) Date: Mar. 15, 2016

(87) PCT Pub. No.: WO2015/049877
PCT Pub. Date: Apr. 9, 2015

(65) Prior Publication Data
US 2016/0223782 A1   Aug. 4, 2016

(30) Foreign Application Priority Data
Oct. 3, 2013   (JP) .................................. 2013-208450

(51) Int. Cl.
*G02B 9/60* (2006.01)
*G02B 13/00* (2006.01)
(Continued)

(52) U.S. Cl.
CPC ................. *G02B 9/60* (2013.01); *G02B 9/34* (2013.01); *G02B 9/58* (2013.01); *G02B 13/004* (2013.01);
(Continued)

(58) Field of Classification Search
CPC ... G02B 9/60; G02B 9/62; G02B 9/64; G02B 13/0045; G02C 9/34; G02C 9/58; G02C 13/004
(Continued)

(56) References Cited

U.S. PATENT DOCUMENTS 5,050,974 A * 9/1991 Takasugi .................. A61B 1/04
359/663
8,107,175 B2   1/2012 Kurashige
(Continued)

FOREIGN PATENT DOCUMENTS

JP   2002-131634 A   5/2002
JP   2005-114787 A   4/2005
(Continued)

OTHER PUBLICATIONS

Dec. 9, 2014 Search Report issued in International Patent Application No. PCT/JP2014/005050.

*Primary Examiner* — Darryl J Collins
(74) *Attorney, Agent, or Firm* — Oliff PLC

(57) ABSTRACT

An imaging lens system includes: in order from an object side, a first lens including a negative meniscus lens having a convex surface facing the object side, a second lens including a positive lens having a convex surface facing the object side, a third lens including a negative lens having a concave surface facing an image side, a fourth lens including a positive lens having a convex surface facing the object side, and a fifth lens including a meniscus lens having a concave surface facing the image side, in which: the imaging lens system further includes an aperture stop arranged on the object side or the image side of the second lens, and the lens surface on the image side of the third lens and the lens surface on the object side of the fourth lens are bonded to each other.

20 Claims, 52 Drawing Sheets

(51) Int. Cl.
   *G02B 13/04* (2006.01)
   *G02B 9/58* (2006.01)
   *G02B 9/34* (2006.01)
   *G02B 27/00* (2006.01)

(52) U.S. Cl.
   CPC ....... *G02B 13/006* (2013.01); *G02B 13/0045* (2013.01); *G02B 13/04* (2013.01); *G02B 27/0025* (2013.01)

(58) Field of Classification Search
   USPC .............................. 359/715, 747, 771, 782
   See application file for complete search history.

(56) References Cited

U.S. PATENT DOCUMENTS

| | | | | |
|---|---|---|---|---|
| 8,331,042 | B2* | 12/2012 | Mori | G02B 13/005 359/713 |
| 2009/0168201 | A1* | 7/2009 | Lai | G02B 9/58 359/708 |
| 2011/0080659 | A1 | 4/2011 | Kurashige | |
| 2014/0240851 | A1* | 8/2014 | Kawamura | G02B 13/04 359/708 |
| 2014/0307333 | A1* | 10/2014 | Kawamura | G02B 13/0045 359/708 |

FOREIGN PATENT DOCUMENTS

| | | |
|---|---|---|
| JP | 2006-091046 A | 4/2006 |
| JP | 2009-186625 A | 8/2009 |
| JP | 2011-076021 A | 4/2011 |
| JP | 2011-076022 A | 4/2011 |
| JP | 5143595 B2 | 2/2013 |

* cited by examiner

EXAMPLE 1

| | | BASIC LENS DATA | | | | | ASPHERICAL DATA | | | | |
|---|---|---|---|---|---|---|---|---|---|---|---|
| LENS No. | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) | K (CONIC COEFFICIENT) | A4 | A6 | A8 | A10 | A12 |
| | 0 | ∞ | INFINITE | 1.00000 | | | | | | | |
| L1 | 1 | 12.424 | 1.000 | 1.80420 | 46.5 | | | | | | |
| | 2 | 3.573 | 4.300 | 1.00000 | | | | | | | |
| L2 | 3 | 6.865 | 2.692 | 1.70154 | 41.1 | | | | | | |
| | 4 | -8.465 | 0.000 | 1.00000 | | | | | | | |
| St | 5 | ∞ | 1.775 | 1.00000 | | | | | | | |
| L3 | 6 | -7.939 | 0.834 | 1.61422 | 25.6 | -24.3331 | -0.0116 | 0.0000 | 8.5237E-05 | -2.0233E-05 | 0.0000 |
| | 7 | 3.194 | 0.000 | 1.00000 | | -1.0480 | -0.0044 | 0.0000 | -4.6874E-05 | 2.3693E-06 | 0.0000 |
| L4 | 8 | 3.194 | 3.340 | 1.53461 | 56.0 | -1.0480 | -0.0044 | 0.0000 | -4.6874E-05 | 2.3693E-06 | 0.0000 |
| | 9 | -2.540 | 1.554 | 1.00000 | | 0.0000 | -0.0055 | 0.0000 | 2.2884E-05 | -2.4303E-06 | 6.5746E-08 |
| L5 | 10 | 11.856 | 0.565 | 1.53461 | 56.0 | 3.7408 | 0.0011 | 0.0000 | -5.4263E-05 | 1.3403E-05 | -1.0597E-06 |
| | 11 | 3.759 | 3.689 | 1.00000 | | 0.0000 | -0.0102 | 0.0000 | 1.6569E-04 | -2.0990E-05 | 4.8125E-07 |

Fig. 12

EXAMPLE 2

BASIC LENS DATA

| LENS No. | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) |
|---|---|---|---|---|---|
|  | 0 | — | INFINITE | 1.00000 |  |
| L1 | 1 | 11.554 | 1.000 | 1.80420 | 46.5 |
|  | 2 | 3.891 | 4.850 | 1.00000 |  |
| L2 | 3 | 6.376 | 2.656 | 1.70154 | 41.1 |
|  | 4 | -9.807 | 0.000 | 1.00000 |  |
| St | 5 | — | 1.665 | 1.00000 |  |
| L3 | 6 | -6.367 | 0.644 | 1.61422 | 25.6 |
|  | 7 | 3.314 | 0.000 | 1.00000 |  |
| L4 | 8 | 3.314 | 3.143 | 1.53461 | 56.0 |
|  | 9 | -2.430 | 1.480 | 1.00000 |  |
| L5 | 10 | 9.296 | 0.636 | 1.53461 | 56.0 |
|  | 11 | 3.458 | 3.551 | 1.00000 |  |

ASPHERICAL DATA

| K (CONIC COEFFICIENT) | A4 | A6 | A8 | A10 | A12 |
|---|---|---|---|---|---|
| -6.0701 | -0.0106354 | 0.0000 | -5.5169E-05 | -2.9585E-06 | 0.0000 |
| -1.0632 | -0.0061485 | 0.0000 | -6.6619E-05 | 6.2589E-06 | 0.0000 |
| -1.0632 | -0.0061485 | 0.0000 | -6.6619E-05 | 6.2589E-06 | 0.0000 |
| 0.0000 | -0.0065971 | 0.0000 | 2.5421E-05 | -2.2383E-06 | 1.6126E-08 |
| 1.2012 | -0.0011732 | 0.0000 | -7.1383E-05 | 1.7843E-05 | -1.4820E-06 |
| 0.0000 | -0.0143301 | 0.0000 | 1.7291E-04 | -2.5117E-05 | 6.7852E-07 |

Fig. 13

EXAMPLE 3

| Lens No. | | BASIC LENS DATA | | | | ASPHERICAL DATA | | | | | |
|---|---|---|---|---|---|---|---|---|---|---|---|
| | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) | K (CONIC COEFFICIENT) | A4 | A6 | A8 | A10 | A12 |
| | 0 | ∞ | INFINITE | 1.00000 | | | | | | | |
| L1 | 1 | 11.686 | 1.000 | 1.80420 | 46.5 | | | | | | |
| | 2 | 3.676 | 5.302 | 1.00000 | | | | | | | |
| L2 | 3 | 6.033 | 1.279 | 1.70154 | 41.1 | | | | | | |
| | 4 | -11.841 | 0.000 | 1.00000 | | | | | | | |
| St | 5 | — | 2.098 | 1.00000 | | | | | | | |
| L3 | 6 | -7.890 | 0.571 | 1.61422 | 25.6 | -12.76366 | -0.0096879 | 0.0000 | -2.9355E-05 | 4.9545E-06 | 0.0000 |
| | 7 | 3.110 | 0.000 | 1.00000 | | -0.88437 | -0.0054321 | 0.0000 | -6.9775E-05 | 8.6418E-06 | 0.0000 |
| L4 | 8 | 3.110 | 3.187 | 1.53461 | 56.0 | -0.88437 | -0.0054321 | 0.0000 | -6.9775E-05 | 8.6418E-06 | 0.0000 |
| | 9 | -2.833 | 1.329 | 1.00000 | | 0.00000 | -0.0050517 | 0.0000 | 1.1157E-05 | 1.4447E-06 | -1.5825E-07 |
| L5 | 10 | 7.789 | 0.992 | 1.53461 | 56.0 | 4.86983 | -0.0045357 | 0.0000 | -8.1278E-06 | 4.3132E-06 | -5.2751E-07 |
| | 11 | 3.559 | 3.646 | 1.00000 | | 0.00000 | -0.0129144 | 0.0000 | 0.000145396 | -2.0232E-05 | 7.1633E-07 |

Fig. 14

EXAMPLE 4

| | | | BASIC LENS DATA | | | | ASPHERICAL DATA | | | | | |
|---|---|---|---|---|---|---|---|---|---|---|---|---|
| Lens No. | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) | K (CONIC COEFFICIENT) | A4 | A6 | A8 | A10 | A12 |
| | 0 | — | INFINITE | 1.00000 | | | | | | | |
| L1 | 1 | 11.911 | 1.000 | 1.80420 | 46.5 | | | | | | |
| | 2 | 3.632 | 5.171 | 1.00000 | | | | | | | |
| L2 | 3 | 6.078 | 1.405 | 1.70154 | 41.1 | | | | | | |
| | 4 | -11.563 | 0.000 | 1.00000 | | | | | | | |
| St | 5 | — | 2.081 | 1.00000 | | | | | | | |
| L3 | 6 | -7.862 | 0.682 | 1.61422 | 25.6 | -13.2001 | -0.0098 | 0.0000 | -4.9110E-06 | 2.8024E-06 | 0.0000 |
| | 7 | 2.909 | 0.000 | 1.00000 | | -1.0218 | -0.0066 | 0.0000 | -4.2380E-05 | 6.3715E-06 | 0.0000 |
| L4 | 8 | 2.909 | 3.035 | 1.53461 | 56.0 | -1.0218 | -0.0066 | 0.0000 | -4.2380E-05 | 6.3715E-06 | 0.0000 |
| | 9 | -2.836 | 1.299 | 1.00000 | | 0.0000 | -0.0047 | 0.0000 | 1.0302E-05 | 1.8219E-06 | -1.7562E-07 |
| L5 | 10 | 7.239 | 1.009 | 1.53461 | 56.0 | 3.8578 | -0.0031 | 0.0000 | -1.1849E-05 | 3.5928E-06 | -3.9763E-07 |
| | 11 | 3.528 | 3.780 | 1.00000 | | 0.0000 | -0.0116 | 0.0000 | 0.00013654 | -1.9522E-05 | 7.2251E-07 |

Fig. 15

EXAMPLE 5

| | | BASIC LENS DATA | | | | ASPHERICAL DATA | | | | | |
|---|---|---|---|---|---|---|---|---|---|---|---|
| LENS No. | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) | K (CONIC COEFFICIENT) | A4 | A6 | A8 | A10 | A12 |
| | 0 | — | INFINITE | 1.00000 | | | | | | | |
| L1 | 1 | 12.894 | 1.000 | 1.80420 | 46.5 | | | | | | |
| | 2 | 3.523 | 4.682 | 1.00000 | | | | | | | |
| L2 | 3 | 6.587 | 1.497 | 1.72342 | 38.0 | | | | | | |
| | 4 | -9.817 | 0.000 | 1.00000 | | | | | | | |
| St | 5 | — | 1.680 | 1.00000 | | | | | | | |
| L3 | 6 | -8.740 | 1.179 | 1.61422 | 25.6 | -15.5550 | -0.007464 | 0.0000 | -5.4865E-06 | 2.7587E-06 | 0.0000 |
| | 7 | 2.659 | 0.000 | 1.00000 | | -0.9512 | -0.006415 | 0.0000 | -3.5251E-05 | 5.4511E-06 | 0.0000 |
| L4 | 8 | 2.659 | 3.130 | 1.53461 | 56.0 | -0.9512 | -0.006415 | 0.0000 | -3.5251E-05 | 5.4511E-06 | 0.0000 |
| | 9 | -2.988 | 1.244 | 1.00000 | | 0.0000 | -0.003891 | 0.0000 | 2.2436E-05 | -6.8648E-07 | -4.7290E-08 |
| L5 | 10 | 7.119 | 1.087 | 1.53461 | 56.0 | 3.6898 | -0.002568 | 0.0000 | -1.9932E-05 | 3.5540E-06 | -3.6066E-07 |
| | 11 | 3.670 | 3.891 | 1.00000 | | 0.0000 | -0.010152 | 0.0000 | 0.00013804 | -2.0825E-05 | 8.5556E-07 |

Fig. 16

EXAMPLE 6

BASIC LENS DATA

| LENS No. | Si (SURFACE NUMBER) | Ri (RADIUS OF CURVATURE) | Di (DISTANCE BETWEEN SURFACES) | Ndi (REFRACTIVE INDEX) | $\nu dj$ (ABBE NUMBER) |
|---|---|---|---|---|---|
|  | 0 | — | INFINITE | 1.00000 |  |
| L1 | 1 | 11.241 | 1.000 | 1.80420 | 46.5 |
|  | 2 | 3.440 | 4.531 | 1.00000 |  |
| L2 | 3 | 5.362 | 1.290 | 1.70154 | 41.1 |
|  | 4 | -11.498 | 0.000 | 1.00000 |  |
| St | 5 | — | 1.801 | 1.00000 |  |
| L3 | 6 | -6.193 | 0.649 | 1.61422 | 25.6 |
|  | 7 | 2.897 | 0.000 | 1.00000 |  |
| L4 | 8 | 2.897 | 2.700 | 1.53461 | 56.0 |
|  | 9 | -2.723 | 1.355 | 1.00000 |  |
| L5 | 10 | 6.338 | 0.839 | 1.53461 | 56.0 |
|  | 11 | 3.549 | 3.803 | 1.00000 |  |

ASPHERICAL DATA

| K (CONIC COEFFICIENT) | A4 | A6 | A8 | A10 | A12 |
|---|---|---|---|---|---|
| -9.7817 | -0.011339 | 0.0000 | 4.0236E-05 | 2.3095E-06 | 0.0000 |
| -0.9422 | -0.008480 | 0.0000 | -5.7591E-05 | 1.2896E-05 | 0.0000 |
| -0.9422 | -0.008480 | 0.0000 | -5.7591E-05 | 1.2896E-05 | 0.0000 |
| 0.0000 | -0.004684 | 0.0000 | 2.2783E-05 | 3.2173E-06 | -3.5658E-07 |
| 2.8664 | -0.002385 | 0.0000 | -2.1416E-05 | 3.1881E-06 | -4.0355E-07 |
| 0.0000 | -0.011067 | 0.0000 | 0.00016305 | -2.6628E-05 | 1.1493E-06 |

EXAMPLE 7

| | | BASIC LENS DATA | | | | ASPHERICAL DATA | | | | |
|---|---|---|---|---|---|---|---|---|---|---|
| LENS No. | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) | K (CONIC COEFFICIENT) | A4 | A6 | A8 | A10 | A12 |
| | 0 | – | INFINITE | 1.00000 | | | | | | | |
| L1 | 1 | 11.530 | 1.000 | 1.80420 | 46.5 | | | | | | |
| | 2 | 3.378 | 4.353 | 1.00000 | | | | | | | |
| L2 | 3 | 5.348 | 1.410 | 1.70154 | 41.1 | | | | | | |
| | 4 | -10.257 | 0.000 | 1.00000 | | | | | | | |
| St | 5 | – | 1.726 | 1.00000 | | | | | | | |
| L3 | 6 | -5.521 | 0.649 | 1.61422 | 25.6 | -0.8012 | -0.0086396 | 0.0000 | 5.3897E-05 | -7.3814E-07 | 0.0000 |
| | 7 | 2.683 | 0.000 | 1.00000 | | -3.7484 | -0.001194 | 0.0000 | -0.0001084 | 1.7052E-05 | 0.0000 |
| L4 | 8 | 2.683 | 2.731 | 1.53461 | 56.0 | -3.7484 | -0.001194 | 0.0000 | -0.0001084 | 1.7052E-05 | 0.0000 |
| | 9 | -2.596 | 1.336 | 1.00000 | | 0.0000 | -0.003574 | 0.0000 | 9.1921E-06 | 4.3576E-06 | -3.6545E-07 |
| L5 | 10 | 8.633 | 0.811 | 1.53461 | 56.0 | 5.7993 | 0.0009103 | 0.0000 | -1.05E-06 | -2.9838E-06 | 1.9884E-07 |
| | 11 | 4.246 | 3.987 | 1.00000 | | 0.0000 | -0.007999 | 0.0000 | 0.0002527 | -4.5545E-05 | 2.6069E-06 |

EXAMPLE 8

| Lens No. | \| | BASIC LENS DATA | | | | \| | ASPHERICAL DATA | | | | | |
|---|---|---|---|---|---|---|---|---|---|---|---|---|
| | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) | | K (CONIC COEFFICIENT) | A4 | A6 | A8 | A10 | A12 |
| | 0 | — | INFINITE | 1.00000 | | | | | | | | |
| L1 | 1 | 10.330 | 1.000 | 1.80420 | 46.5 | | | | | | | |
| | 2 | 3.247 | 3.580 | 1.00000 | | | | | | | | |
| L2 | 3 | 4.113 | 1.282 | 1.70154 | 41.1 | | | | | | | |
| | 4 | -13.022 | 0.000 | 1.00000 | | | | | | | | |
| St | 5 | — | 1.616 | 1.00000 | | | | | | | | |
| L3 | 6 | -3.688 | 0.646 | 1.61422 | 25.6 | | 0.5293 | -0.002590 | 0.0000 | 0.00045437 | -7.3814E-05 | 0.0000 |
| | 7 | 3.617 | 0.000 | 1.00000 | | | 0.0000 | 0.0000 | 0.0000 | 0.0000 | 0.0000 | 0.0000 |
| L4 | 8 | 3.617 | 2.283 | 1.53461 | 56.0 | | 0.0000 | 0.002687 | 0.0000 | -8.8998E-05 | 4.2204E-05 | -2.9998E-06 |
| | 9 | -2.685 | 0.099 | 1.00000 | | | 0.0000 | 0.001847 | 0.0000 | 1.2206E-06 | 1.7372E-06 | -1.1725E-07 |
| L5 | 10 | 6.917 | 2.284 | 1.53461 | 56.0 | | 2.6602 | 0.001847 | 0.0000 | 0.00043726 | -7.9310E-05 | 5.2312E-06 |
| | 11 | 4.989 | 3.695 | 1.00000 | | | 0.0000 | -0.010381 | 0.0000 | | | |

Fig. 19

EXAMPLE 9

| Lens No. | | BASIC LENS DATA | | | | ASPHERICAL DATA | | | | | |
|---|---|---|---|---|---|---|---|---|---|---|---|
| | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) | K (CONIC COEFFICIENT) | A4 | A6 | A8 | A10 | A12 |
| | 0 | ∞ | INFINITE | 1.00000 | | | | | | | |
| L1 | 1 | 8.470 | 1.000 | 1.80420 | 46.5 | | | | | | |
| | 2 | 2.787 | 2.307 | 1.00000 | | | | | | | |
| L2 | 3 | 4.057 | 1.231 | 1.70154 | 41.1 | | | | | | |
| | 4 | −8.274 | 0.000 | 1.00000 | | | | | | | |
| St | 5 | — | 1.413 | | | | | | | | |
| L3 | 6 | −4.293 | 0.647 | 1.61422 | 25.6 | 2.1625 | −0.002546 | 0.0000 | 0.0001910 | −2.6859E−05 | 0.0000 |
| | 7 | 3.386 | 0.000 | 1.00000 | | 0.0000 | 0.0000 | 0.0000 | 0.0000 | 0.0000 | 0.0000 |
| L4 | 8 | 3.386 | 2.419 | 1.53461 | 56.0 | 0.0000 | 0.0009571 | 0.0000 | −8.6714E−05 | 3.6806E−05 | −2.2200E−06 |
| | 9 | −2.825 | 0.537 | 1.00000 | | 2.4419 | −0.003734 | 0.0000 | 3.9819E−05 | 4.5564E−07 | −1.8725E−07 |
| L5 | 10 | 7.479 | 3.077 | 1.53461 | 56.0 | 0.0000 | −0.01280 | 0.0000 | 0.0001605 | −2.1794E−05 | 1.3079E−06 |
| | 11 | 4.845 | 2.282 | 1.00000 | | | | | | | |

Fig. 20

| COMPARATIVE EXAMPLE | | | | | | | | | | | |
|---|---|---|---|---|---|---|---|---|---|---|---|
| BASIC LENS DATA | | | | | ASPHERICAL DATA | | | | | | |
| LENS No. | Si (SURFACE NUMBER) | Ri (RADIUS OF CURVATURE) | Di (DISTANCE BETWEEN SURFACES) | Ndi (REFRACTIVE INDEX) | νdj (ABBE NUMBER) | K (CONIC COEFFICIENT) | A4 | A6 | A8 | A10 | A12 |
| | 0 | — | INFINITE | 1.00000 | | | | | | | |
| L1 | 1 | 15.029 | 1.000 | 1.80420 | 46.5 | | | | | | |
| | 2 | 3.493 | 4.108 | 1.00000 | | | | | | | |
| L2 | 3 | 6.240 | 2.866 | 1.70154 | 41.1 | | | | | | |
| | 4 | -8.356 | 0.000 | 1.00000 | | | | | | | |
| St | 5 | — | 1.836 | 1.00000 | | | | | | | |
| L3 | 6 | -6.645 | 0.650 | 1.61422 | 25.6 | -2.3146 | -0.0088610 | 0.0000 | -0.00017777 | 2.4464E-05 | 0.0000 |
| | 7 | 3.343 | 0.000 | 1.00000 | | -0.4781 | -0.0106813 | 0.0000 | -0.00031933 | 3.4889E-05 | 0.0000 |
| L4 | 8 | 3.343 | 2.479 | 1.53461 | 56.0 | -0.4781 | -0.0106813 | 0.0000 | -0.00031933 | 3.4889E-05 | 0.0000 |
| | 9 | -3.428 | 2.931 | 1.00000 | | 0.0000 | -0.0064784 | 0.0000 | 3.7559E-05 | -4.9707E-07 | -1.6082E-07 |
| L5 | 10 | 120.926 | 0.777 | 1.53461 | 56.0 | 1447.7570 | -8.522E-04 | 0.0000 | 9.2036E-05 | -1.3588E-05 | 4.9691E-07 |
| | 11 | -71.076 | 3.199 | 1.00000 | | 0.0000 | -0.0019757 | 0.0000 | 0.00012947 | -1.9401E-05 | 7.8424E-07 |

Fig. 21

| ITEM | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | COMPARATIVE EXAMPLE |
|---|---|---|---|---|---|---|---|---|---|---|
| F VALUE | 1.8 | 1.8 | 1.8 | 1.8 | 1.8 | 1.8 | 1.8 | 1.8 | 1.8 | 1.8 |
| f | 4.630 | 4.633 | 4.629 | 4.630 | 4.630 | 4.630 | 4.630 | 4.630 | 4.630 | 4.630 |
| f1/f | -1.411 | -1.664 | -1.518 | -1.476 | -1.360 | -1.405 | -1.351 | -1.350 | -1.204 | -1.265 |
| f2/f | 1.251 | 1.268 | 1.261 | 1.261 | 1.216 | 1.156 | 1.118 | 0.987 | 0.869 | 1.190 |
| f3/f | -2.055 | -1.749 | -2.038 | -1.994 | -2.082 | -1.663 | -1.493 | -1.121 | -1.268 | -1.814 |
| f4/f | 1.095 | 1.042 | 1.246 | 1.260 | 1.351 | 1.210 | 1.153 | 1.175 | 1.250 | 1.564 |
| f5/f | -2.269 | -2.302 | -2.873 | -3.060 | -3.423 | -3.626 | -3.593 | -12.276 | -9.349 | 18.034 |
| FB/f | 0.580 | 0.589 | 0.584 | 0.592 | 0.639 | 0.620 | 0.661 | 0.613 | 0.382 | 0.691 |
| L4R2D | 6.38 | 6.06 | 6.00 | 5.98 | 6.02 | 5.54 | 5.57 | 5.03 | 4.91 | 5.94 |
| L5R1D | 5.94 | 5.85 | 5.92 | 6.03 | 6.02 | 5.89 | 6.04 | 6.69 | 5.96 | 6.29 |
| L5R2R/f | 0.812 | 0.746 | 0.769 | 0.762 | 0.793 | 0.767 | 0.917 | 1.077 | 1.046 | -15.351 |
| ρ345/ρ12 | 0.510 | 0.474 | 0.395 | 0.413 | 0.426 | 0.394 | 0.382 | 0.369 | 0.413 | 0.544 |
| PARAXIAL FOCUS CHANGE AMOUNT UNDER TEMPERATURE -40°C | -0.008 | -0.006 | 0.001 | -0.005 | -0.006 | -0.001 | -0.007 | -0.009 | 0.013 | — |
| PARAXIAL FOCUS CHANGE AMOUNT UNDER TEMPERATURE 85°C | -0.004 | -0.006 | -0.013 | -0.012 | -0.008 | -0.012 | -0.024 | -0.019 | -0.021 | — |

Fig. 22

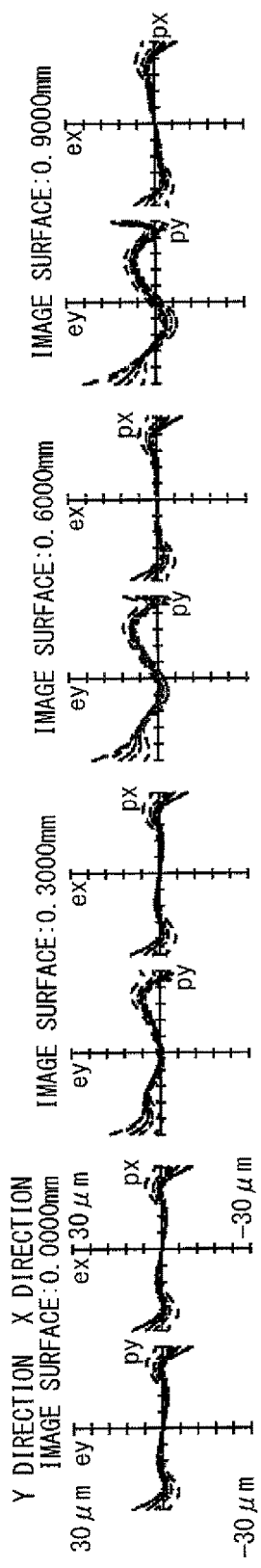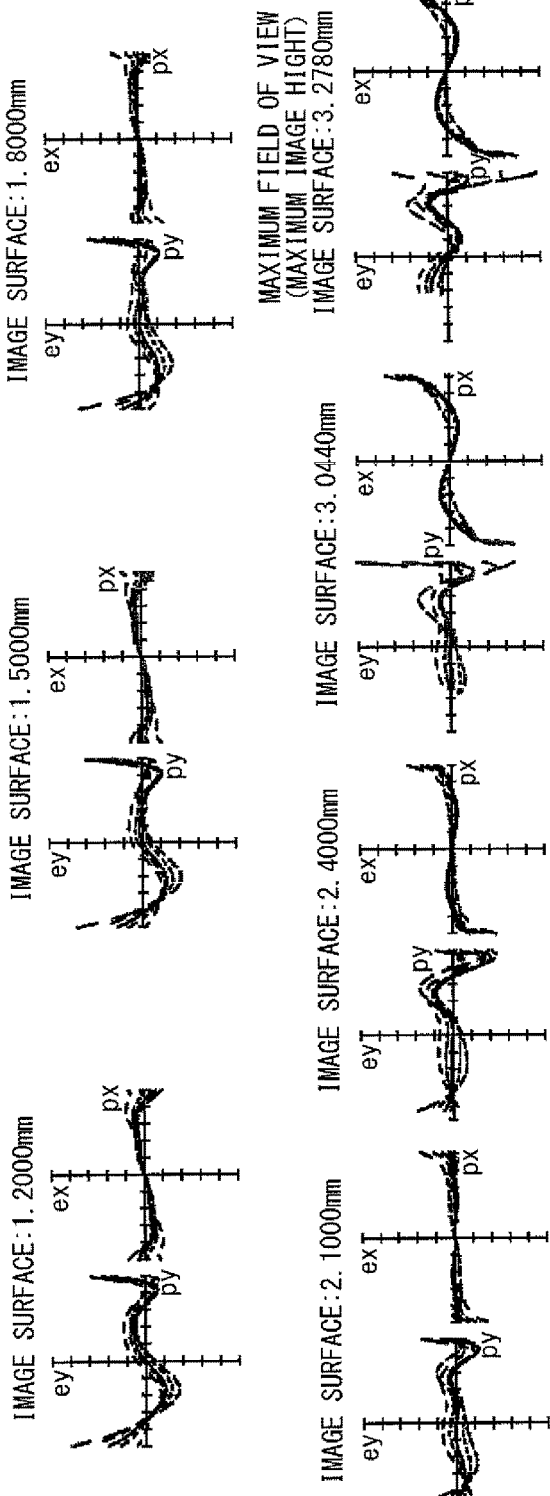
Fig. 23

IMAGING LENS SYSTEM AND IMAGING DEVICE

TECHNICAL FIELD

The present invention relates to an imaging lens system and an imaging device including the imaging lens system, and more particularly, to an imaging lens system and an imaging device including the imaging lens system suitably used in an in-vehicle camera, a monitoring camera or the like that uses an image pick-up device such as a CCD image sensor or a CMOS image sensor.

BACKGROUND ART

In recent years, there has been a significant improvement in performance and reduction in size of a monitoring camera and an in-vehicle camera that use an image pick-up device such as a CCD image sensor or a CMOS image sensor and there has been a growing demand for an imaging lens system with a small F-value and excellent lens speed. It is generally known that when the F-value of the imaging lens system decreases, the field curvature and the lateral aberration increases and an imaging performance deteriorates.

Patent Literature 1 discloses an imaging lens system used for an in-vehicle camera, a monitoring camera or the like. The imaging lens system disclosed in Patent Literature 1 includes six spherical glass lenses.

CITATION LIST

Patent Literature

[Patent Literature 1] Japanese Patent No. 5143595

SUMMARY OF INVENTION

Technical Problem

In the monitoring camera and the in-vehicle camera, an imaging lens system using a large number of glass lenses has been conventionally used since there are significant changes in the temperature where the imaging lens system is used. However, due to a recent improvement in the heat resistance of resin materials, there has been a growing demand for use of plastic lenses that are less expensive and can be mass-produced also for the monitoring camera and the in-vehicle camera. Further, by use of aspherical lenses, an improvement of the imaging performance and a reduction in the number of lenses can be expected.

In the imaging lens system disclosed in Patent Literature 1, the F-value is 2.0, which is relatively large, and the field curvature and the lateral aberration are also relatively large. Further, the imaging lens system disclosed in Patent Literature 1 uses six spherical glass lenses. The number of lenses increases compared to the case in which aspherical plastic lenses are used, which means the imaging lens system becomes expensive.

The present invention has been made in order to solve the above problem and aims to provide an imaging lens system that has an excellent lens speed, a high imaging performance, and a performance that hardly deteriorates even when the temperature changes, and is less expensive.

Solution to Problem

An imaging lens system according to the present invention includes: in order from an object side, a first lens including a negative meniscus lens having a convex surface facing the object side, a second lens including a positive lens having a convex surface facing the object side, a third lens including a negative lens having a concave surface facing an image side, a fourth lens including a positive lens having a convex surface facing the object side, and a fifth lens including a meniscus lens having a concave surface facing the image side, in which the imaging lens system further includes an aperture stop arranged on the object side or the image side of the second lens, and the lens surface on the image side of the third lens and the lens surface on the object side of the fourth lens are bonded to each other.

An imaging device according to the present invention includes: the imaging lens system described above; a planar cover glass arranged on an object side of the imaging lens system; and an image pick-up device arranged in a focal position of the imaging lens system.

Advantageous Effects of Invention

According to the imaging lens system of the present invention, it is possible to provide an imaging lens system that has an excellent lens speed, a high imaging performance, and a performance that is hardly deteriorated even when the temperature changes, and is less expensive.

BRIEF DESCRIPTION OF DRAWINGS

FIG. 12 is a table showing basic lens data and aspherical data of the imaging lens system according to the Example 1 of the present invention;

FIG. 13 is a table showing basic lens data and aspherical data of the imaging lens system according to the Example 2 of the present invention;

FIG. 14 is a table showing basic lens data and aspherical data of the imaging lens system according to the Example 3 of the present invention;

FIG. 15 is a table showing basic lens data and aspherical data of the imaging lens system according to the Example 4 of the present invention;

FIG. 16 is a table showing basic lens data and aspherical data of the imaging lens system according to the Example 5 of the present invention;

FIG. 17 is a table showing basic lens data and aspherical data of the imaging lens system according to the Example 6 of the present invention;

FIG. 18 is a table showing basic lens data and aspherical data of the imaging lens system according to the Example 7 of the present invention;

FIG. 19 is a table showing basic lens data and aspherical data of the imaging lens system according to the Example 8 of the present invention;

FIG. 20 is a table showing basic lens data and aspherical data of the imaging lens system according to the Example 9 of the present invention;

FIG. 21 is a table showing basic lens data and aspherical data of the imaging lens system according to the comparative example of the present invention;

FIG. 22 is a table showing characteristic values of the Examples 1 to 9 and the comparative example of the present invention;

FIG. 23 is a lateral aberration diagram of the imaging lens system according to the Example 1 of the present invention;

DESCRIPTION OF EMBODIMENTS

Figure 1:
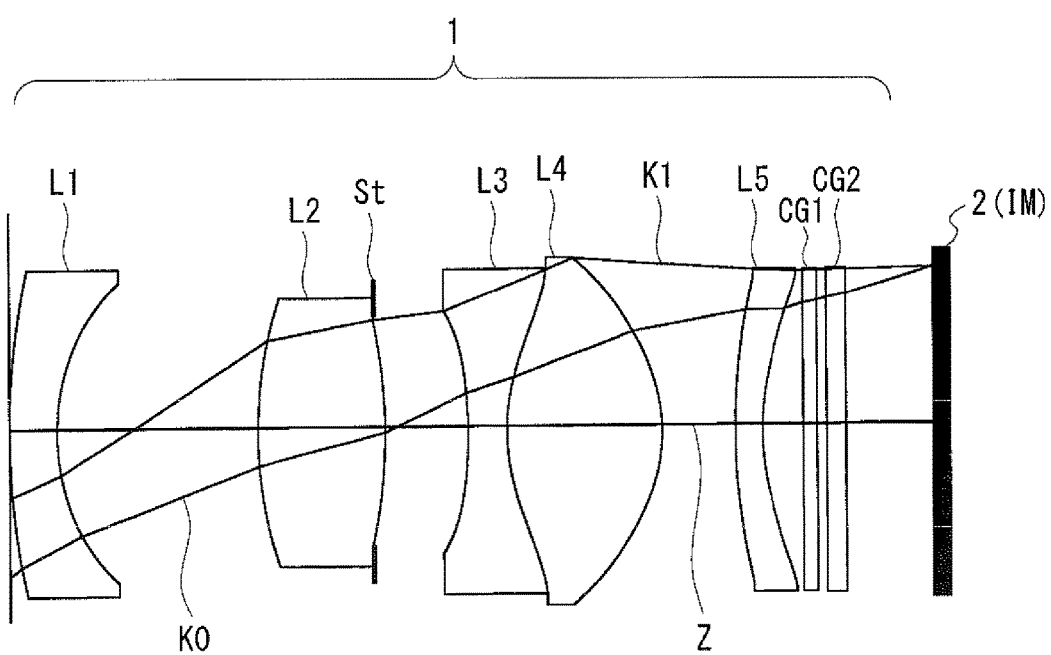
FIG. 1 is a diagram showing a cross section of an imaging lens system and a principal ray and an upper ray at a maximum angle of view according to one embodiment of the present invention.

Hereinafter, with reference to the drawings, an embodiment of the present invention will be described in detail. FIG. 1 shows a cross-sectional view of an imaging lens system 1, which is one example of the embodiment of the present invention and corresponds to Example 1 that will be described later. In FIG. 1, the left side is an object side, the right side is an image side, and rays are incident on the imaging lens system 1 from the object side.

As shown in FIG. 1, the imaging lens system 1 includes, in order from the object side, a first lens L1 made of a negative meniscus lens having a convex surface facing the object side, a second lens L2 made of a positive lens having a convex surface facing the object side, an aperture stop St, a third lens L3 made of a negative lens, a fourth lens L4 made of a positive lens having a convex surface facing the object side, and a fifth lens L5 made of a meniscus lens having a concave surface facing the image side.

The aperture stop St included in the imaging lens system 1 is arranged on the object side or the image side of the second lens L2. For example, the aperture stop St is preferably arranged in a position adjacent to the object side or the image side of the second lens L2. In the imaging lens system 1, the lens surface on the image side of the third lens L3 and the lens surface on the object side of the fourth lens L4 are bonded to each other.

FIG. 1 shows a principal ray K0 at a maximum angle of view (maximum field of view) of the imaging lens system 1 and an upper ray K1 at the maximum angle of view that passes the upper end of the effective diameter of the lenses (the third lens L3, the fourth lens L4, and the fifth lens L5) positioned on the image side with respect to the stop St.

By employing the above lens configurations, the upper ray K1 at the maximum angle of view that is directed to the fifth lens L5 from the fourth lens L4 may be directed in the direction of an optical axis Z. It is therefore possible to increase the effective diameters of the third lens L3 and the fourth lens L4. This increases the degree of freedom of designing of the third lens L3 and the fourth lens L4, whereby it is possible to reduce the lateral aberration and the field curvature in an image-forming position of the imaging lens system 1.

FIG. 1 also shows an image pick-up device 2 in the image-forming position of the imaging lens system 1 in consideration of a case in which the imaging lens system 1 is applied to an imaging device. The image pick-up device 2 receives an image formed by the imaging lens system 1 and converts the received image into an electric signal. The image pick-up device 2 is formed of, for example, a Charge Coupled Device (CCD) image sensor or a Complementary Metal Oxide Semiconductor (CMOS) image sensor.

A cover glass for an image pick-up device or a filter (e.g., an infrared cut filter, an ultraviolet cut filter, a visible light cut filter, a low-pass filter) may be arranged between the fifth lens L5 and the image pick-up device 2 according to the configuration of the imaging device. In the imaging lens system 1, a first cover glass CG1 and a second cover glass CG2 are arranged between the fifth lens L5 and the image pick-up device 2. The first cover glass CG1 and the second cover glass CG2 are glass plates having a refractive index Nd=1.517 with respect to the d-line. The thickness of the first cover glass CG1 is 0.3 mm and the thickness of the second cover glass CG2 is 0.4 mm. The material, the thickness, and the number of glass plates may be changed as necessary or the glass plates may be omitted.

When the imaging lens system 1 and the image pick-up device 2 are combined and the combined device is used as an imaging device, a planar cover glass arranged on the object side of the imaging lens system 1 may be further provided. It is therefore possible to prevent the first lens L1 of the imaging lens system 1 from being scratched or becoming dirty.

In the imaging lens system 1, the fifth lens L5 is a meniscus lens having negative power and the following conditional expression (1) is preferably satisfied.

$$-4 \leq f5/f \leq -1.5 \quad (1)$$

where f is a focal length of the entire lens system of the imaging lens system 1; and f5 is a focal length of the fifth lens L5.

More preferably, the conditional expression (1) satisfies $-3.6 \leq f5/f \leq -2.2$.

By setting the value of f5/f to −1.5 or smaller, the back focus of the imaging lens system 1 can be increased. Accordingly, the flange back of the imaging lens system 1 can be increased. Therefore, components such as the above filters can be provided in a vacant space. The flange back means the distance from a position that is the closest to the image surface in the of the effective diameter of the lens surface on the image side of the fifth lens L5 to the image surface IM.

By setting the value of f5/f to −4 or larger, the degradation of the lateral aberration can be suppressed. By setting the value of f5/f to −1.5 or smaller, the flange back can be increased. Specifically, the flange back can be long enough to satisfy the following conditional expression (2):

$$FB/f \geq 0.52 \quad (2)$$

where

FB is an air-equivalent distance from the position that is the closest to the image surface in the outside of the effective diameter of the lens surface on the image side of the fifth lens L5 to the image surface IM; and f is a focal length of the entire lens system of the imaging lens system 1.

More specifically, the conditional expression (2) satisfies $0.67 \geq FB/f \geq 0.58$.

Further, in the imaging lens system 1, by forming the fifth lens L5 by a negative meniscus lens which is convex toward the image side, the height of the beam from the optical axis Z in the fourth lens L4 becomes relatively high. It is therefore possible to increase the effective diameters of the fourth lens L4 and the third lens L3, whereby the degree of freedom of designing of the lens surfaces in the fourth lens L4 and the third lens L3 increases. As a result, it is possible to reduce the lateral aberration and the axial chromatic aberration of the imaging lens system 1. More specifically, satisfying the following conditional expression (3) enables a further reduction in the lateral aberration and the axial chromatic aberration of the imaging lens system 1.

$$L4R2D \geq L5R1D \quad (3)$$

where

L4R2D is an effective diameter of the lens surface on the image side of the fourth lens L4; and L5R1D is an effective diameter of the lens surface on the object side of the fifth lens L5.

In this case, preferably, the shape of the lens surface on the image side of the fifth lens L5 does not have the extremum at which the concave shape is changed to the convex shape in the range from the optical axis Z to the edge of the effective diameter of the lens. Further, the radius of curvature of the lens surface on the image side of the fifth lens L5 preferably satisfies the following conditional expression (4).

$$0.5 \leq L5R2R/f \leq 3 \quad (4)$$

where f is a focal length of the entire lens system of the imaging lens system 1; and L5R2R is a radius of curvature of the lens surface on the image side of the fifth lens L5.

More preferably, the conditional expression (4) satisfies $0.7 \leq L5R2R/f \leq 1.1$.

When this conditional expression (4) is not satisfied, the upper ray K1 that is incident on the fifth lens L5 at the maximum angle of view is hardly directed to the optical axis Z. It is therefore difficult to increase the effective diameter of the fourth lens L4.

Further, when the F-value is less than 2.0 in the imaging lens system 1, the following conditional expressions (5) to (8) are preferably satisfied. It is therefore possible to further decrease the lateral aberration and the field curvature of the imaging lens system 1.

$$-2.2 \leq f1/f \leq -0.9 \quad (5)$$

$$0.5 \leq f2/f \leq 1.6 \quad (6)$$

$$-2.8 \leq f3/f \leq -0.5 \quad (7)$$

$$0.6 \leq f4/f \leq 1.7 \quad (8)$$

where f1 is a focal length of the first lens L1;

f2 is a focal length of the second lens L2;
f3 is a focal length of the third lens L3;
f4 is a focal length of the fourth lens L4; and
f is a focal length of the entire lens system of the imaging lens system 1.

The conditional expression (5) preferably satisfies $-1.7 \leq f1/f \leq -1.1$. More preferably, the conditional expression (5) satisfies $-1.7 \leq f1/f \leq -1.3$. The conditional expression (6) preferably satisfies $0.8 \leq f2/f \leq 1.3$. More preferably, the conditional expression (6) satisfies $0.8 \leq f2/f \leq 1.1$. The conditional expression (7) preferably satisfies $-2.1 \leq f3/f \leq -1.0$. More preferably, the conditional expression (7) satisfies $-2.1 \leq f3/f \leq -1.9$. More preferably, the conditional expression (8) satisfies $1.0 \leq f4/f \leq 1.4$.

Further, in the imaging lens system 1, the second lens L2 and the fourth lens L4 are biconvex lenses, the third lens L3 is a biconcave lens, and the following conditional expression (9) is preferably satisfied. It is therefore possible to reduce the chromatic aberration of the imaging lens system 1.

$$v4 - v3 \geq 15 \quad (9)$$

where
v3 is an Abbe number of the third lens L3; and
v4 is an Abbe number of the fourth lens L4.

In the cemented lens of the third lens L3 and the fourth lens L4, it is preferable that the Abbe number of the third lens L3 having negative power be decreased and the Abbe number of the fourth lens L4 having positive power be increased. It is therefore possible to correct the chromatic aberration of the imaging lens system 1.

Further, by using the aspherical lenses as the third lens L3, the fourth lens L4, and the fifth lens L5, the lateral aberration and the field curvature can be further decreased. In this case, plastic aspherical lenses are preferably used since glass molded aspherical lenses are expensive.

The imaging lens system 1 preferably satisfies the following conditional expression (10).

$$0.36 \leq \rho 345/\rho 12 \leq 0.52 \quad (10)$$

where
$\rho 12$ is a composite power of the first lens L1 and the second lens L2; and
$\rho 345$ is a composite power of the third lens L3, the fourth lens L4, and the fifth lens L5.

When the composite focal length of the first lens L1 and the second lens L2 is denoted by f12, $\rho 12 = 1/f12$ is satisfied. When the composite focal length of the third lens L3, the fourth lens L4, and the fifth lens L5 is denoted by f345, $\rho 345 = 1/f345$ is satisfied.

In the imaging lens system 1, it is required to decrease the amount of change in the focal position due to changes in the temperature. The changes in the focal position due to the changes in the temperature are generated since the refractive indices and the shapes of the lenses change due to the changes in the temperature. The refractive index of the glass is prone to increase as the temperature increases. On the other hand, the refractive index of the plastic is prone to decrease as the temperature increases. The amount of change in the refractive index in the plastic due to the changes in the temperature is much larger than that in the glass. Further, the linear expansion coefficient of the plastic is larger than that of the glass. Therefore, the amount of change in the shape of the lens in the plastic due to an expansion or a contraction of the lens when the temperature changes is larger than that in the glass.

When the first lens L1 and the second lens L2 are glass lenses and the third lens L3, the fourth lens L4, and the fifth lens L5 are plastic lenses, satisfying $0.36 \leq \rho 345/\rho 12 \leq 0.52$ enables cancellation of the changes in the focal positions of the first lens L1 and the second lens L2 by the changes in the focal positions of the third lens L3, the fourth lens L4, and the fifth lens L5 and reduction in the amount of change in the focal position of the whole lens system of the imaging lens system 1.

According to the imaging lens system 1 of this embodiment, the material of each lens, the shape of each surface, and the power of each lens are suitably set, whereby it is possible to provide an imaging lens system in which the F-value is small, the imaging performance is high, and the amount of change in the focal position due to the changes in the temperature is small.

EXAMPLES

Hereinafter, with reference to specific examples, the imaging lens system 1 according to the embodiment will be described further in detail.

Example 1

Figure 3:
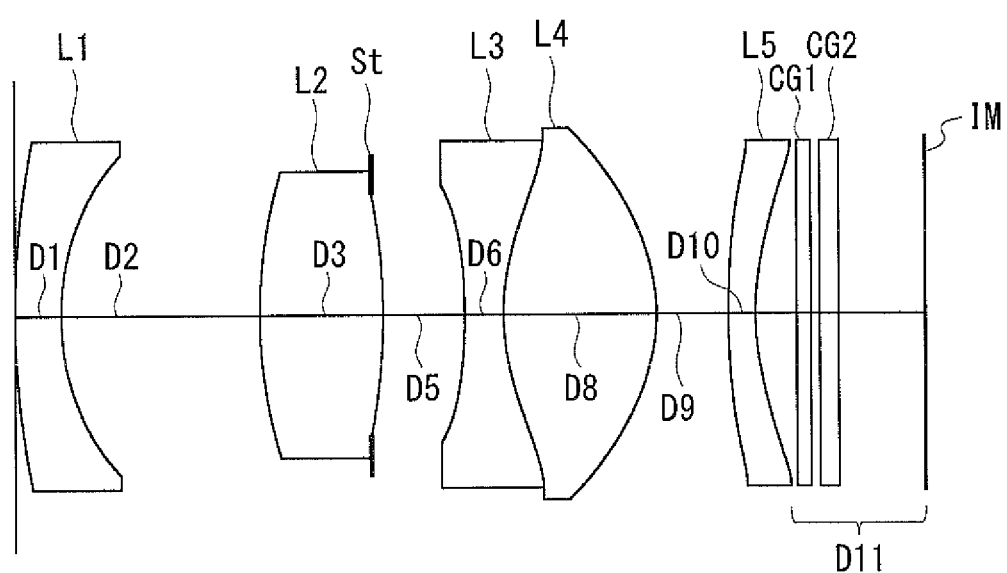
FIG. 3 is a cross-sectional view showing a lens configuration of an imaging lens system according to Example 1 of the present invention.

The configuration of the imaging lens system 1 according to Example 1 is shown in FIG. 3. FIG. 12 shows a table of the corresponding basic lens data and the corresponding aspherical data. The lateral aberration diagram according to this Example is shown in FIG. 23, the field curvature diagram according to this Example is shown in FIG. 33, and the axial chromatic aberration diagram according to this Example is shown in FIG. 43.

In the lateral aberration diagram shown in FIG. 23, the maximum angle of view is divided into ten parts and the lateral aberration of a Y direction (tangential direction) and an X direction (sagittal direction) at each angle of view is shown. In the lateral aberration diagram, 22 graphs in total are shown, including eleven sets including the angle of view 0 (the image heights on the image surface are 0.0, 0.3, 0.6, 0.9, 1.2, 1.5, 1.8, 2.1, 2.4, 3.044, and 3.278). The horizontal axis of the graph indicates relative pupil coordinates in the Y direction or the X direction in each angle of view and the vertical axis of the graph indicates the lateral aberration value in the direction orthogonal to the optical axis on the image surface. Further, each graph shows lateral aberration values in five wavelengths. The dominant wavelength, 0.546 µm, is indicated by a solid line. The other four wavelengths are shown by four kinds of dashed lines, with wavelengths of 0.486 µm, 0.436 µm, 0.656 and 0.588 µm being shown in an ascending order of the length of the dashed lines.

Figure 33:
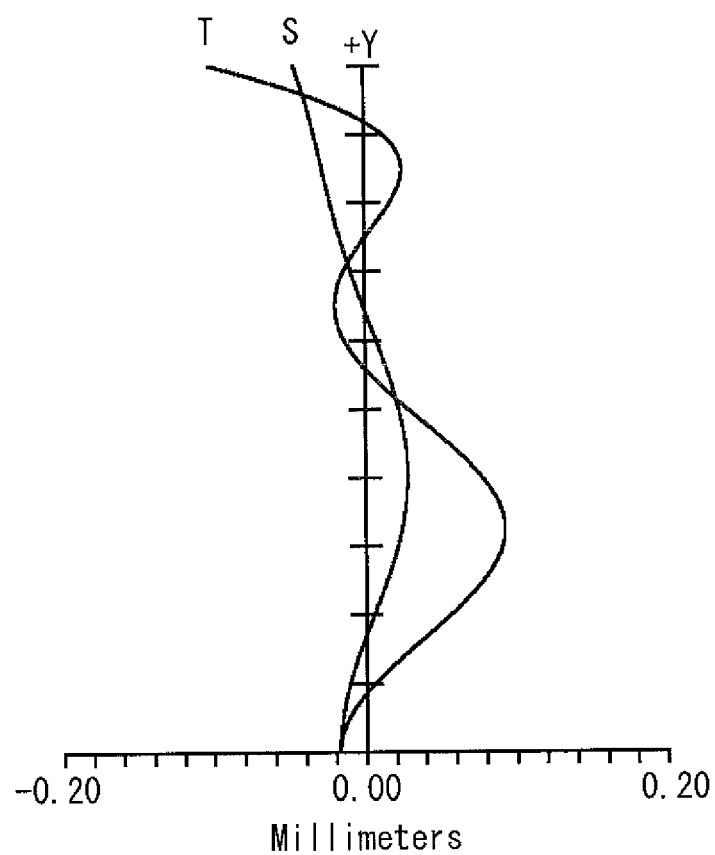
FIG. 33 is a field curvature diagram of the imaging lens system according to the Example 1 of the present invention.

In the field curvature diagram shown in FIG. 33, T denotes a tangential direction and S denotes a sagittal direction. The horizontal axis indicates the field curvature value, with the positive side indicating the far direction and the negative side indicating the near direction. The vertical axis is a relative angle of view normalized at the maximum angle of view.

Figure 43:
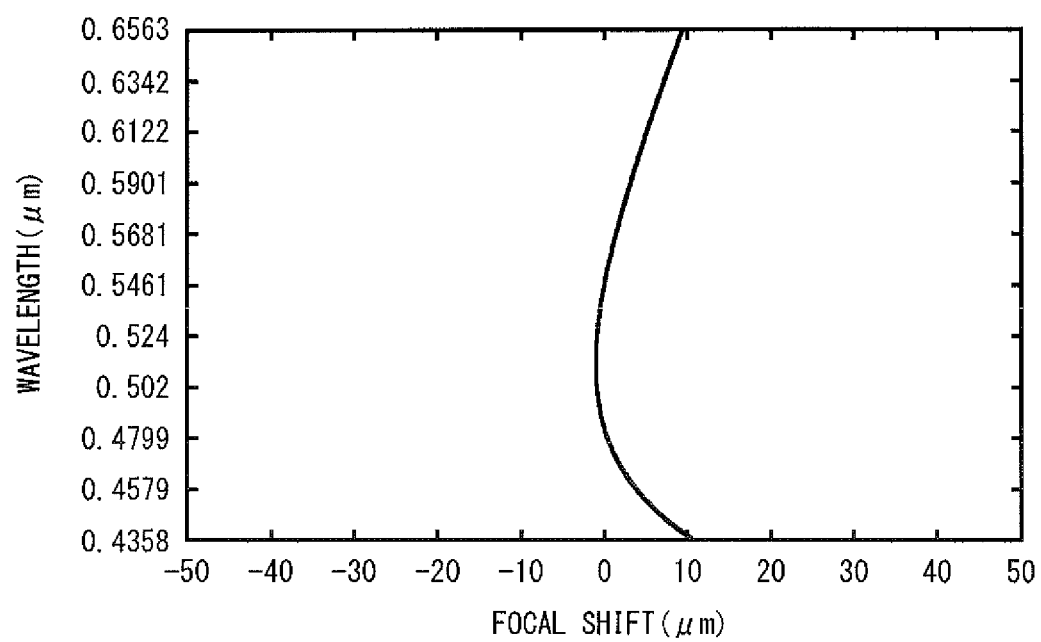
FIG. 43 is an axial chromatic aberration diagram of the imaging lens system according to the Example 1 of the present invention.

In the axial chromatic aberration diagram shown in FIG. 43, the horizontal axis indicates the focal position, with the positive side indicating the far direction and the negative side indicating the near direction, and the vertical axis indicates the wavelength.

In FIG. 3, the left side is the object side, the right side is the image side, and the image surface is shown as IM. Further, the aperture stop St does not represent the shape or the size thereof and represents the position thereof on the optical axis Z.

In the basic lens data and the aspherical data shown in FIG. 12, Si indicates the i-th surface, the value of i sequentially increasing from the surface of the constituent element at the most object side, which is designated as 1, toward the image side. Ri indicates the radius of curvature of the i-th surface. Di indicates the distance (distance among surfaces) between the i-th surface Si and the (i+1)-th surface Si+1 on the optical axis Z. Ndi indicates the refractive index of the medium on the distance among surfaces Di with respect to the d-line (wavelength: 0.5876 μm). The symbol vdj (j is an integer from 1 to 5, inclusive) indicates an Abbe number of the material of the lens corresponding to the lens numbers L1 to L5 with respect to the d-line. In the basic lens data, the object surface located at infinity and the aperture stop St (column of the lens No.) are also included. The sign of the radius of curvature is positive in the case in which a surface shape is convex on the object side and negative in the case in which the surface shape is convex on the image side. In FIG. 12, the units of the radius of curvature and the distance among surfaces are mm. FIG. 12 further shows the aspherical coefficient of each lens surface as the aspherical data, and the surface which does not include the aspherical data is a spherical surface.

The aspherical shape is represented by the following expression:

$$Sag(h) = (h^2/R)/\{1+\sqrt{(1-(1+K)\times h^2/R^2)}\} + A4 \times h^4 + A6 \times h^6 + A8 \times h^8 + A10 \times h^{10} + A12 \times h^{12}$$

where h is a height of the lens surface in the direction vertical to the optical axis;

Sag(h) is a distance (sag) in the optical axis Z direction from a tangent plane at a top of the aspherical surface on the optical axis Z to a position on the aspherical surface at the height h;

R is a radius of curvature;

K is a conic coefficient (conic constant); and

An is an n-dimension aspherical coefficient.

Example 2

Figure 4:
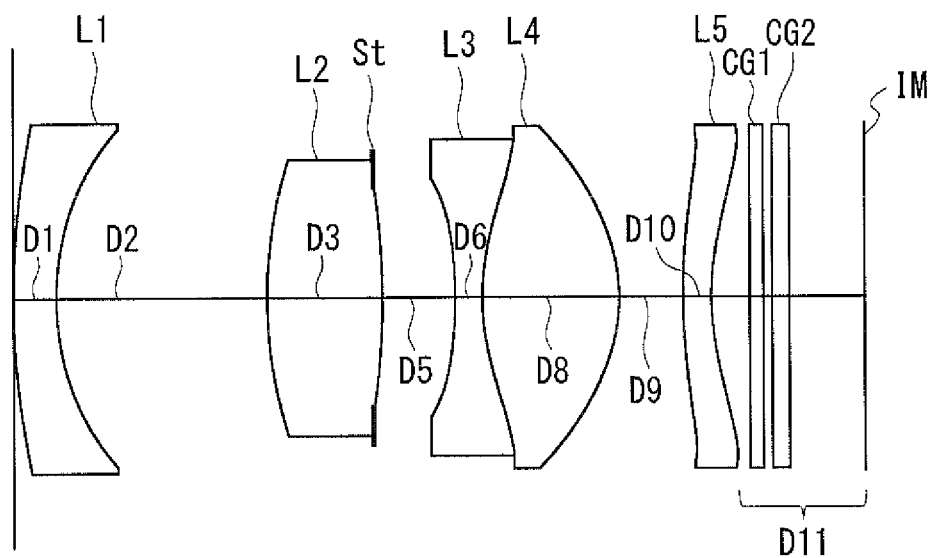
FIG. 4 is a cross-sectional view showing a lens configuration of an imaging lens system according to Example 2 of the present invention.
Figure 24:
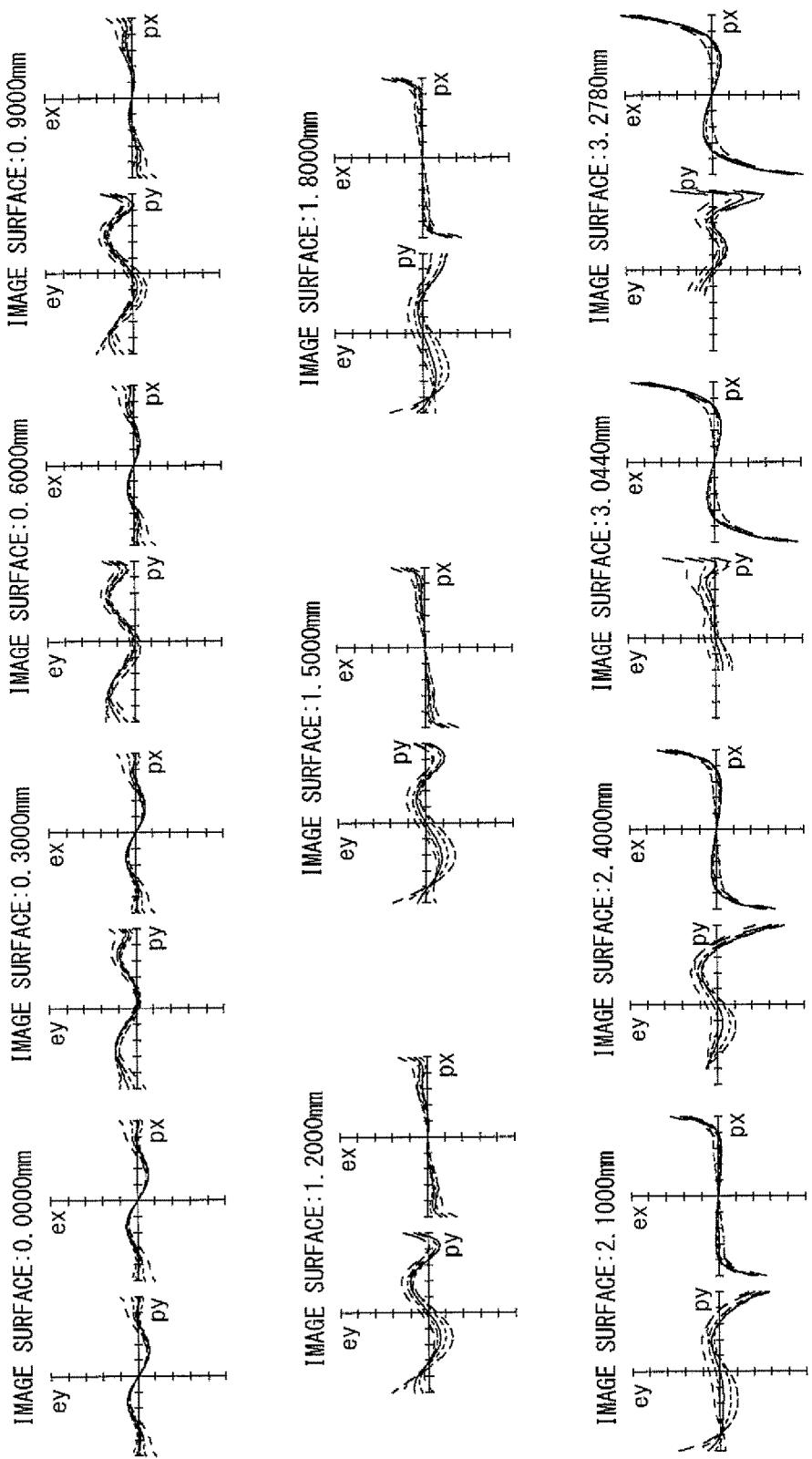
FIG. 24 is a lateral aberration diagram of the imaging lens system according to the Example 2 of the present invention.
Figure 34:
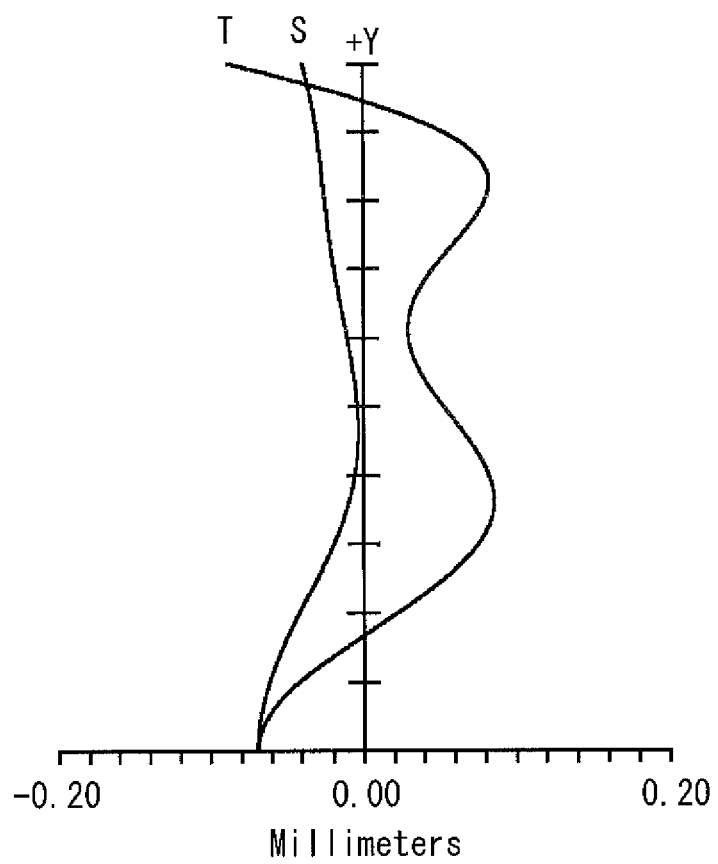
FIG. 34 is a field curvature diagram of the imaging lens system according to the Example 2 of the present invention.
Figure 44:
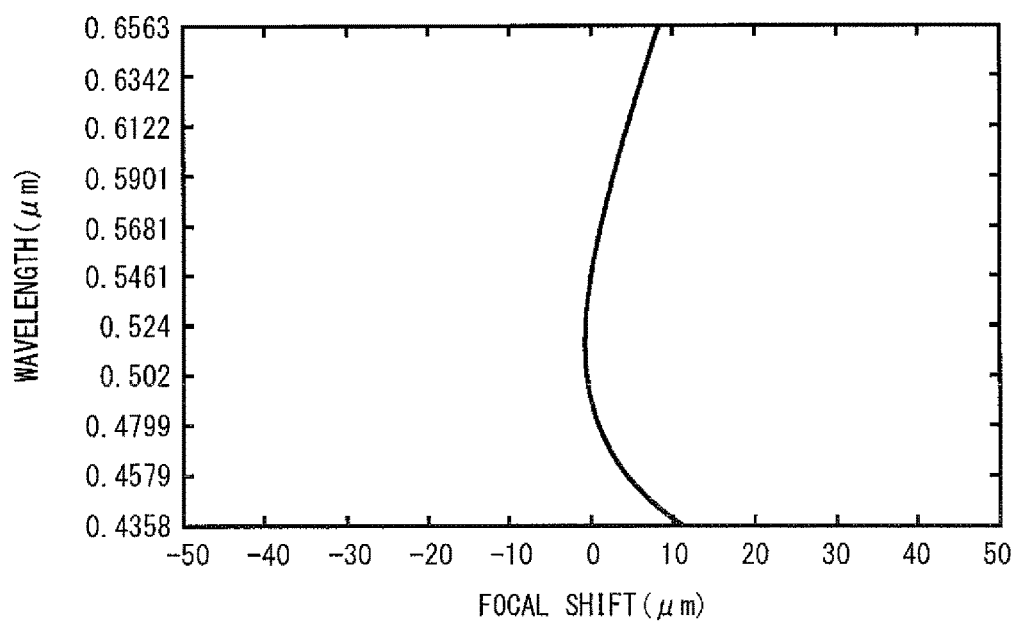
FIG. 44 is an axial chromatic aberration diagram of the imaging lens system according to the Example 2 of the present invention.

The configuration of an imaging lens system 1 according to Example 2 is shown in FIG. 4. The corresponding basic lens data and the corresponding aspherical data are shown in FIG. 13. The lateral aberration diagram according to this Example is shown in FIG. 24, the field curvature diagram according to this Example is shown in FIG. 34, and the axial chromatic aberration diagram according to this Example is shown in FIG. 44.

Example 3

Figure 5:
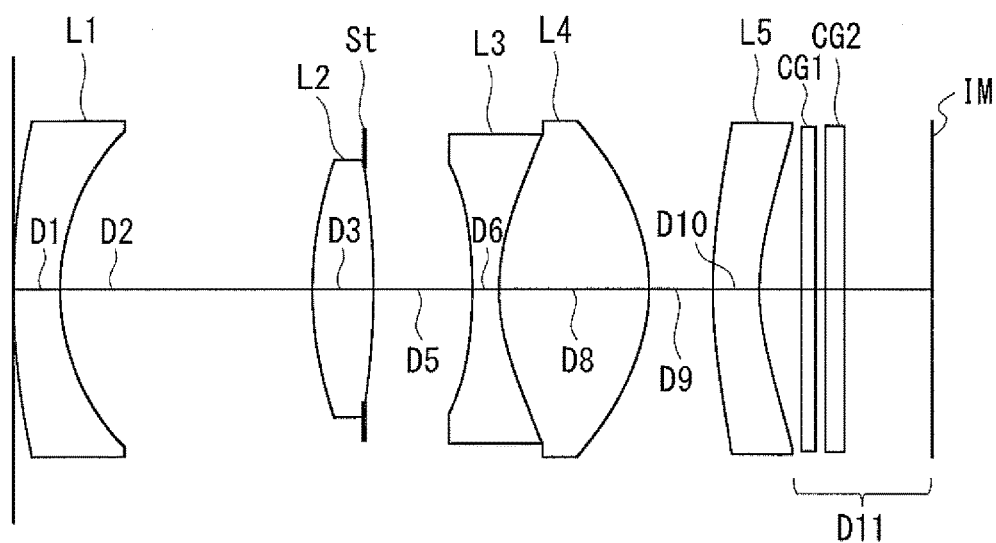
FIG. 5 is a cross-sectional view showing a lens configuration of an imaging lens system according to Example 3 of the present invention.
Figure 25:
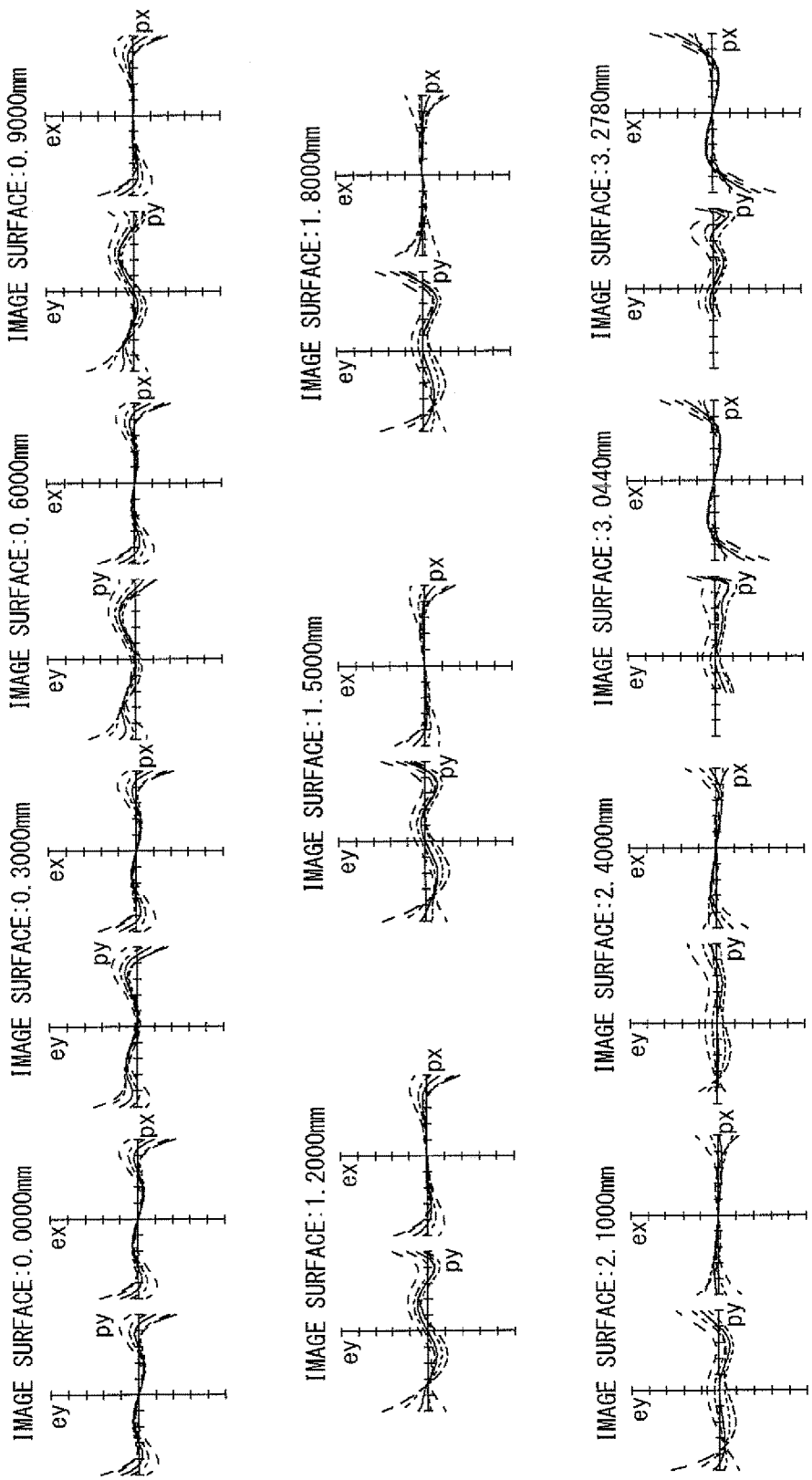
FIG. 25 is a lateral aberration diagram of the imaging lens system according to the Example 3 of the present invention.
Figure 35:
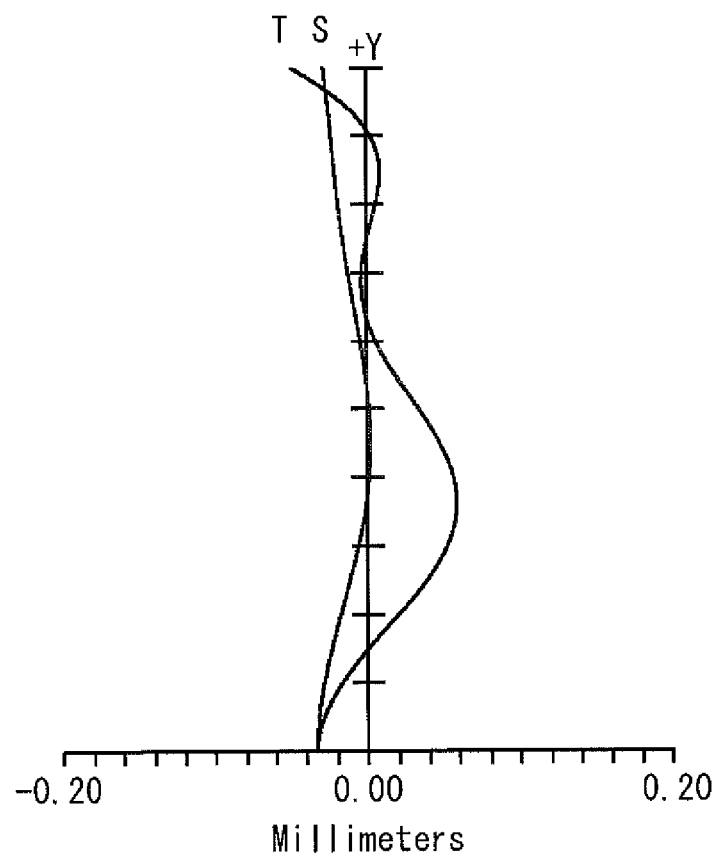
FIG. 35 is a field curvature diagram of the imaging lens system according to the Example 3 of the present invention.
Figure 45:
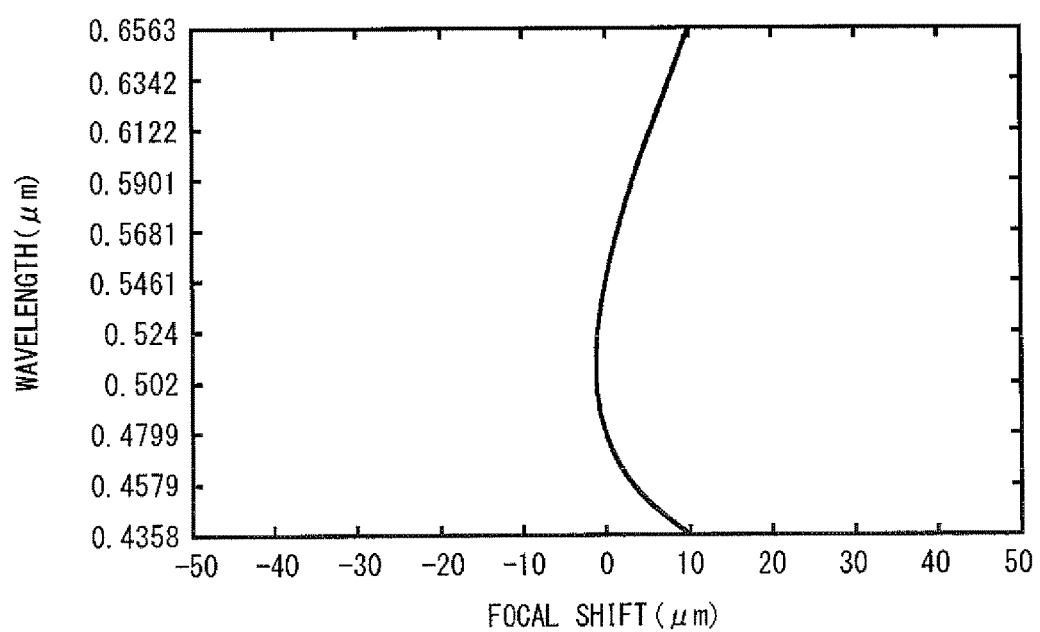
FIG. 45 is an axial chromatic aberration diagram of the imaging lens system according to the Example 3 of the present invention.

The configuration of an imaging lens system 1 according to Example 3 is shown in FIG. 5. The corresponding basic lens data and the corresponding aspherical data are shown in FIG. 14. The lateral aberration diagram according to this Example is shown in FIG. 25, the field curvature diagram according to this Example is shown in FIG. 35, and the axial chromatic aberration diagram according to this Example is shown in FIG. 45.

Example 4

Figure 6:
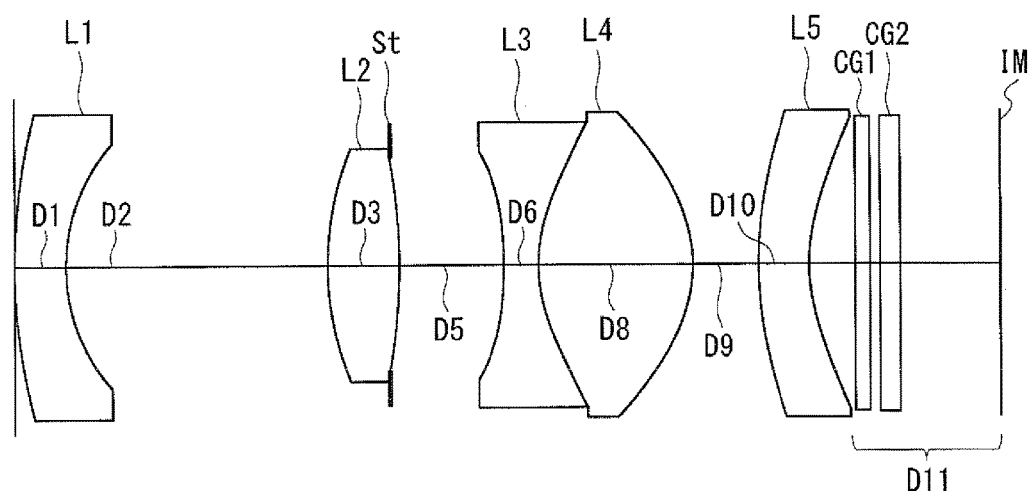
FIG. 6 is a cross-sectional view showing a lens configuration of an imaging lens system according to Example 4 of the present invention.
Figure 26:
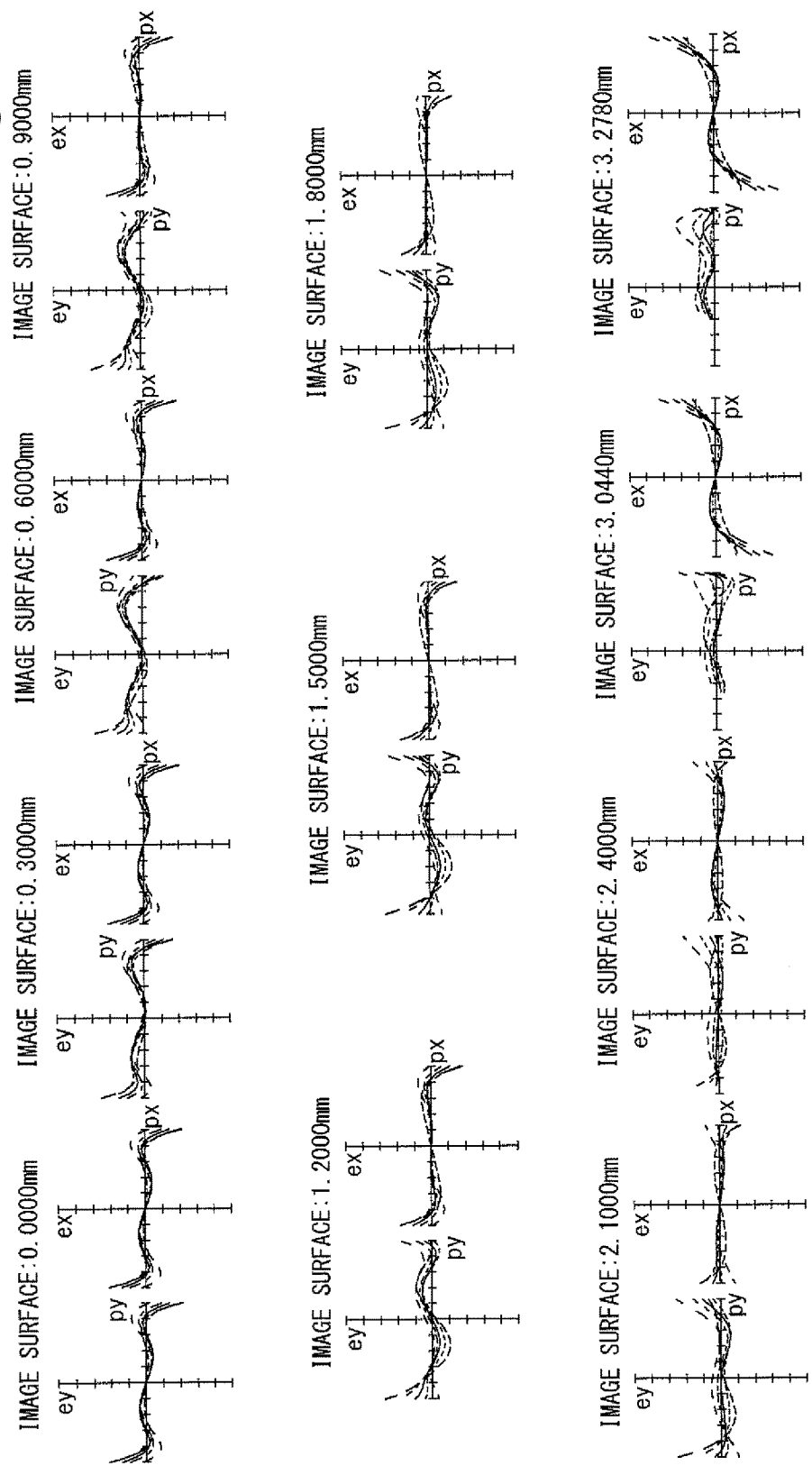
FIG. 26 is a lateral aberration diagram of the imaging lens system according to the Example 4 of the present invention.
Figure 36:
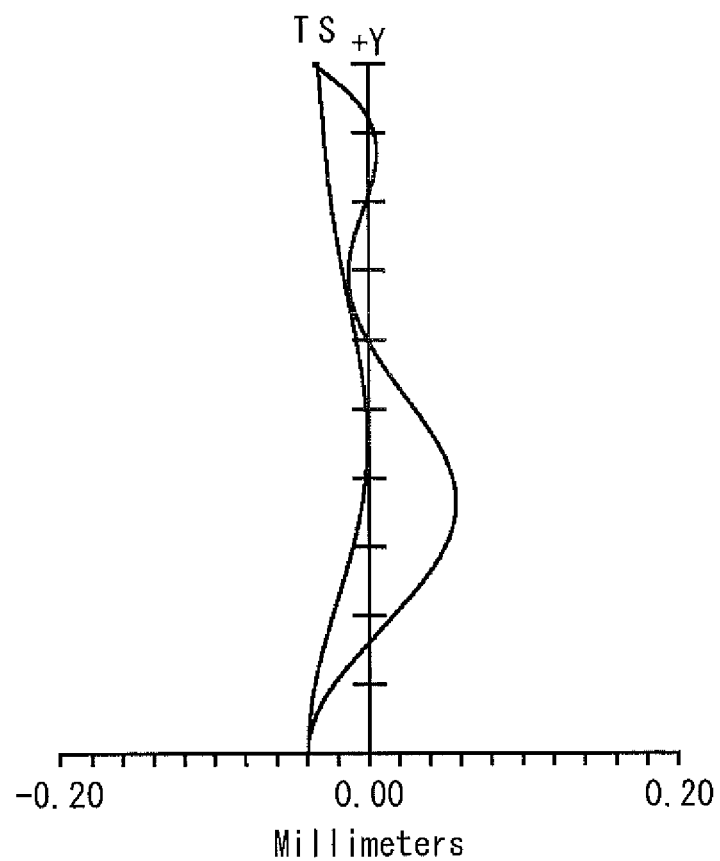
FIG. 36 is a field curvature diagram of the imaging lens system according to the Example 4 of the present invention.
Figure 46:
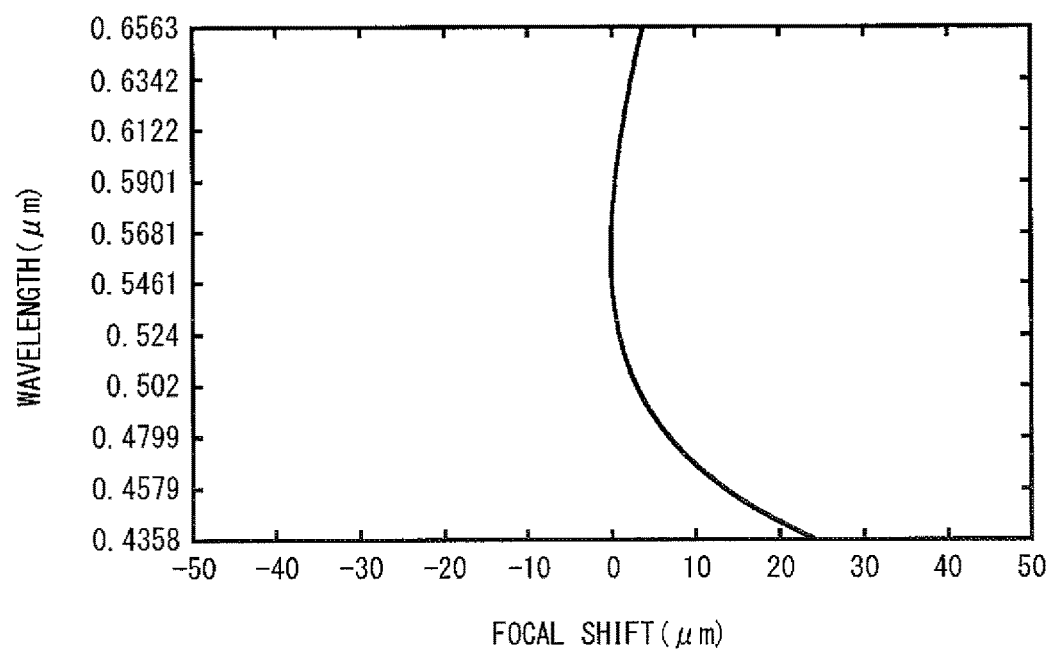
FIG. 46 is an axial chromatic aberration diagram of the imaging lens system according to the Example 4 of the present invention.

The configuration of an imaging lens system 1 according to Example 4 is shown in FIG. 6. The corresponding basic lens data and the corresponding aspherical data are shown in FIG. 15. The lateral aberration diagram according to this Example is shown in FIG. 26, the field curvature diagram according to this Example is shown in FIG. 36, and the axial chromatic aberration diagram according to this Example is shown in FIG. 46.

Example 5

Figure 7:
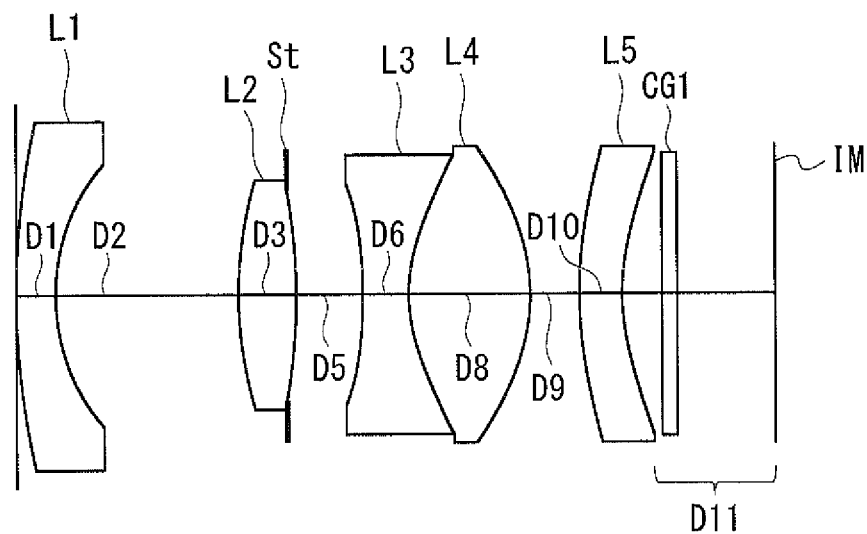
FIG. 7 is a cross-sectional view showing a lens configuration of an imaging lens system according to Example 5 of the present invention.
Figure 27:
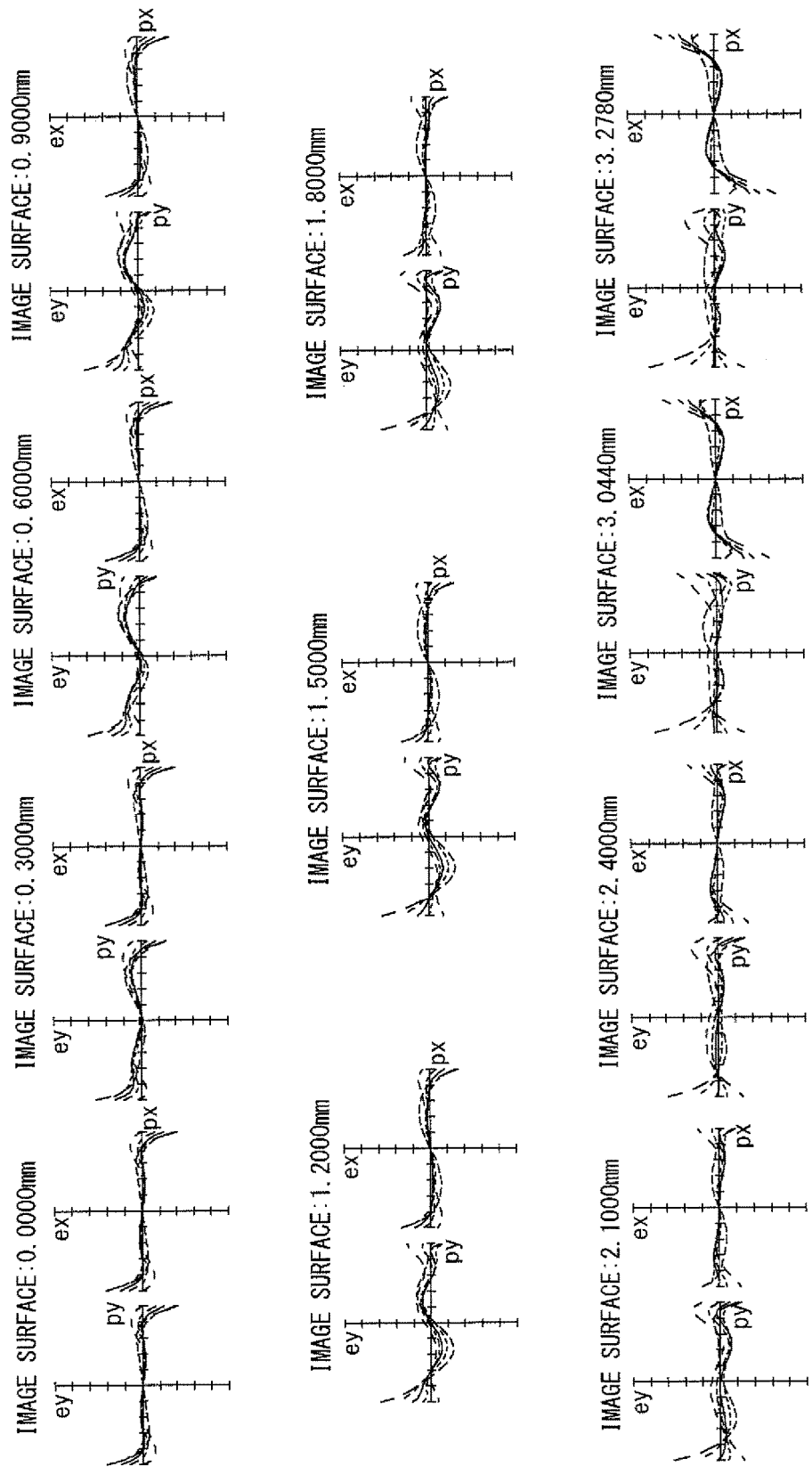
FIG. 27 is a lateral aberration diagram of the imaging lens system according to the Example 5 of the present invention.
Figure 37:
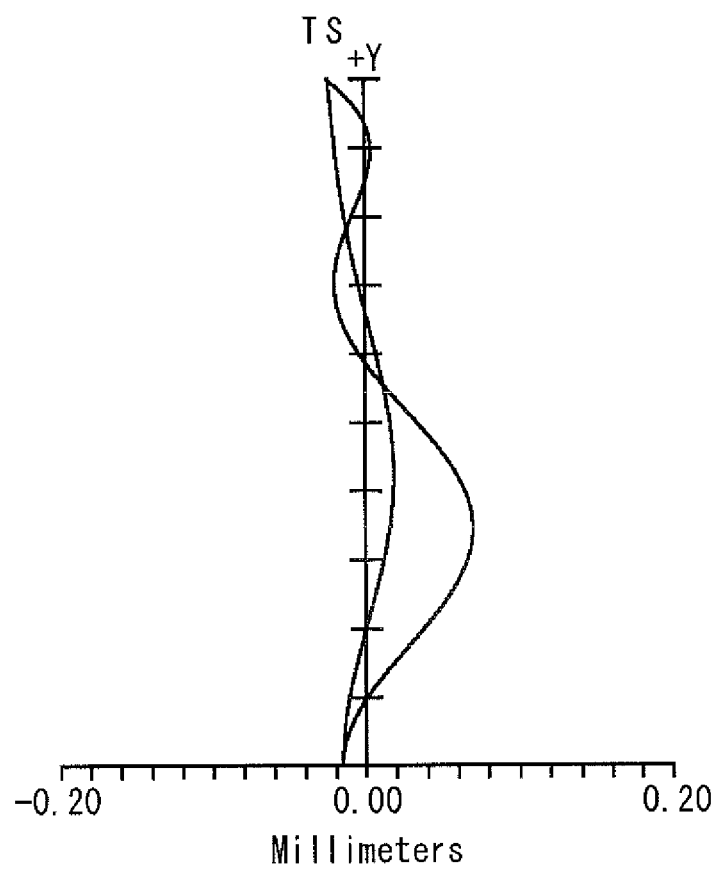
FIG. 37 is a field curvature diagram of the imaging lens system according to the Example 5 of the present invention.
Figure 47:
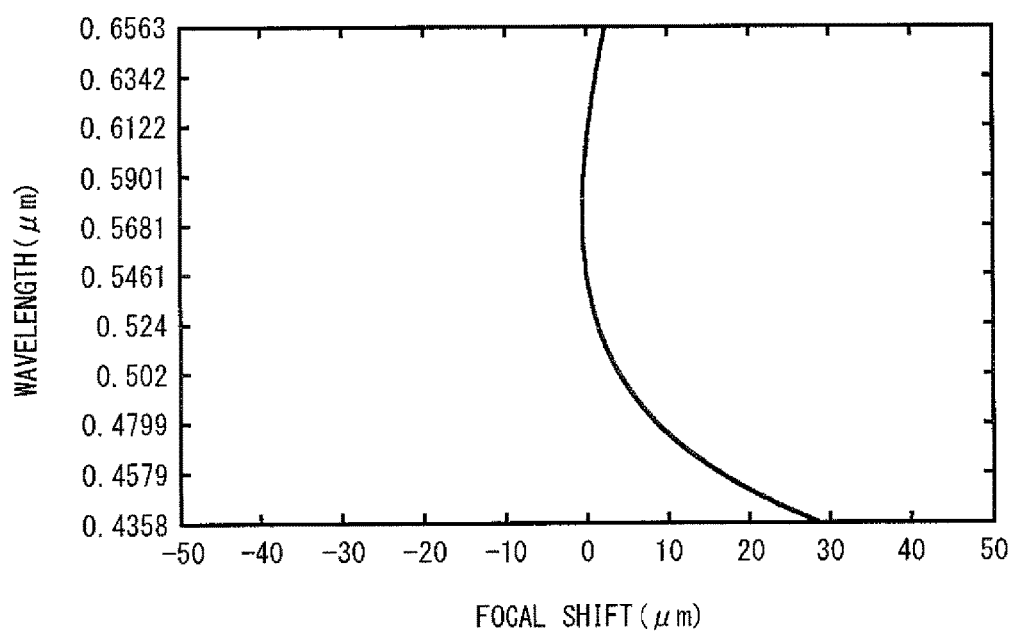
FIG. 47 is an axial chromatic aberration diagram of the imaging lens system according to the Example 5 of the present invention.

The configuration of an imaging lens system 1 according to Example 5 is shown in FIG. 7. The corresponding basic lens data and the corresponding aspherical data are shown in FIG. 16. The lateral aberration diagram according to this Example is shown in FIG. 27, the field curvature diagram according to this Example is shown in FIG. 37, and the axial chromatic aberration diagram according to this Example is shown in FIG. 47.

Example 6

Figure 8:
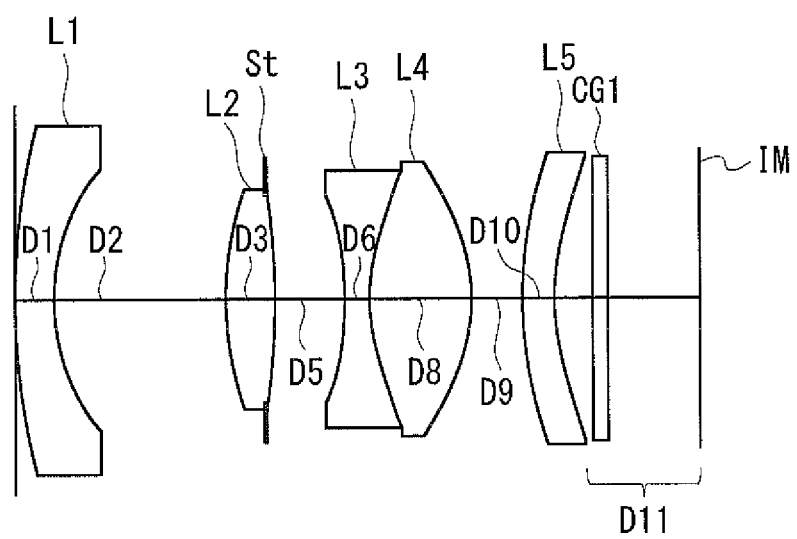
FIG. 8 is a cross-sectional view showing a lens configuration of an imaging lens system according to Example 6 of the present invention.
Figure 28:
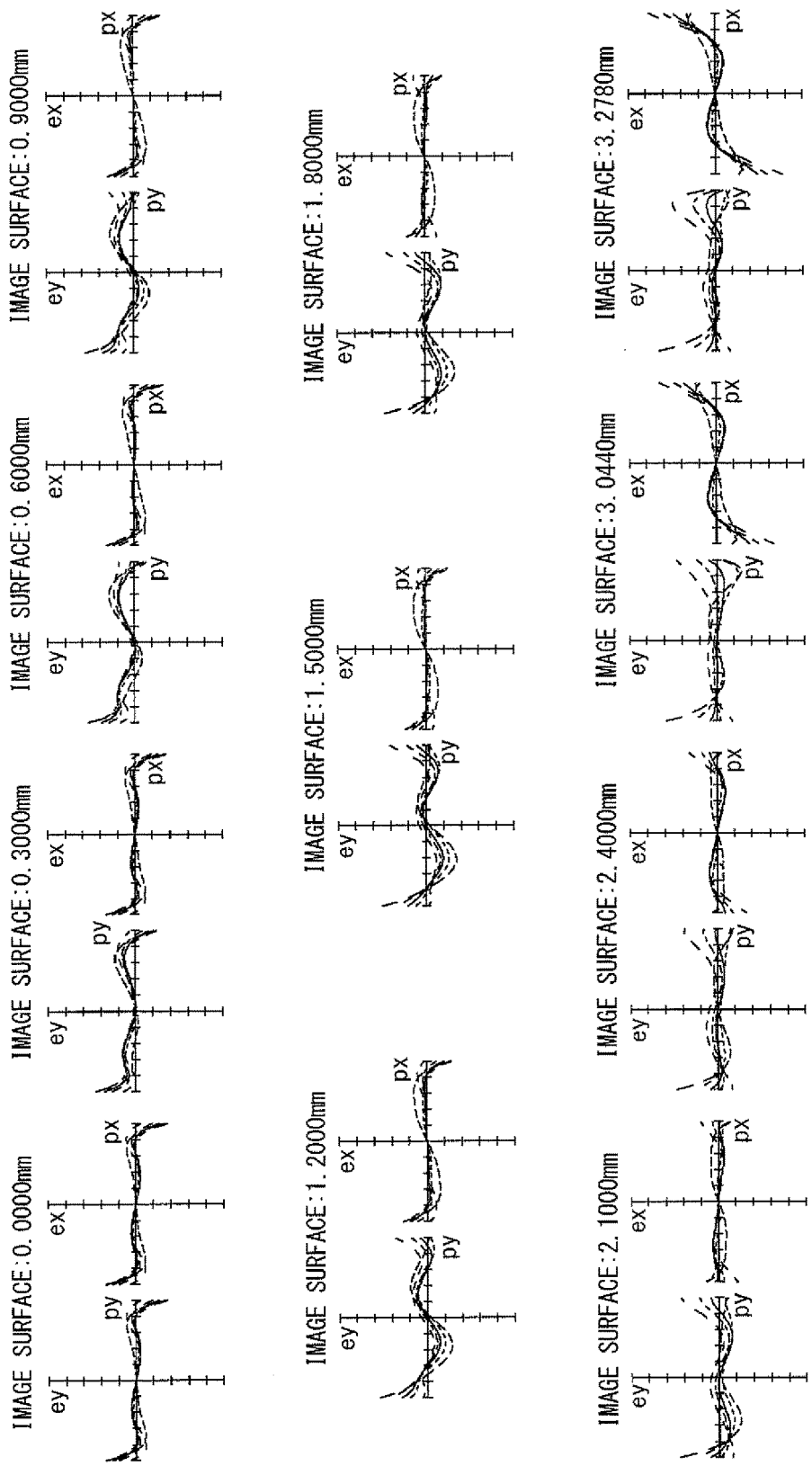
FIG. 28 is a lateral aberration diagram of the imaging lens system according to the Example 6 of the present invention.
Figure 38:
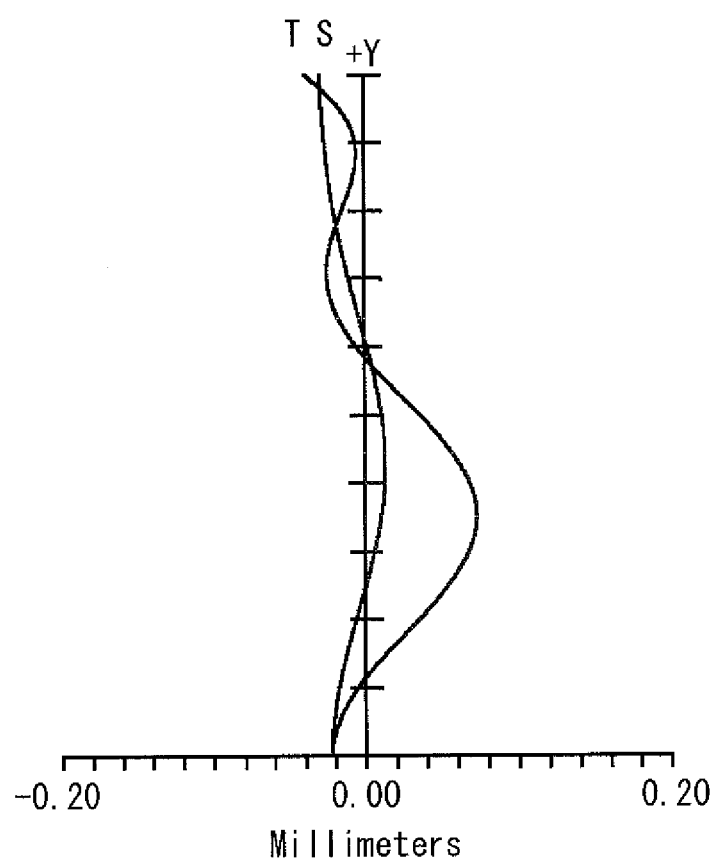
FIG. 38 is a field curvature diagram of the imaging lens system according to the Example 6 of the present invention.
Figure 48:
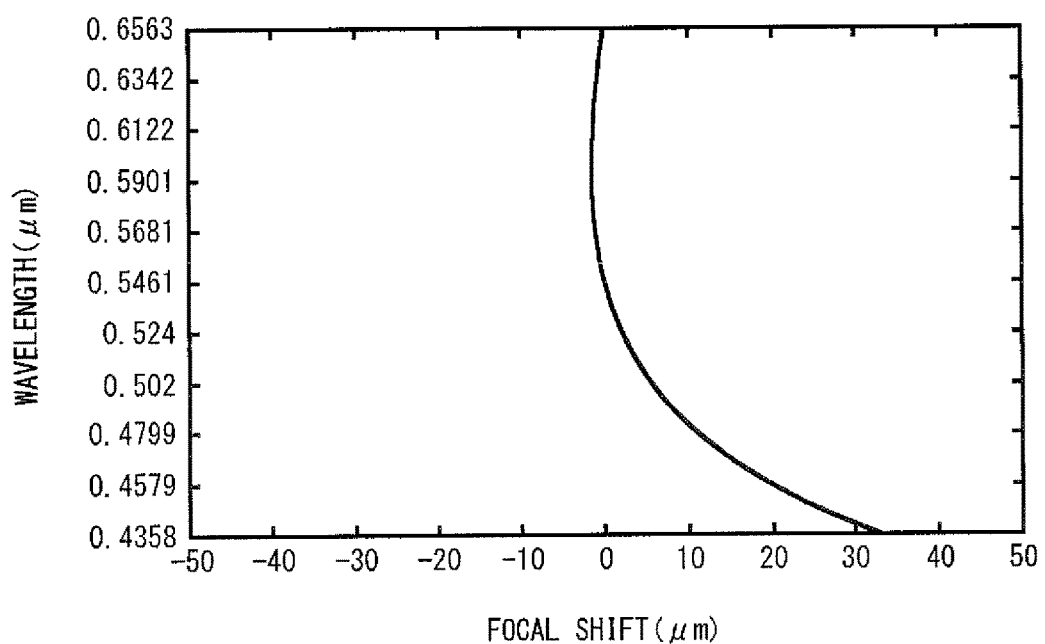
FIG. 48 is an axial chromatic aberration diagram of the imaging lens system according to the Example 6 of the present invention.

The configuration of an imaging lens system 1 according to Example 6 is shown in FIG. 8. The corresponding basic lens data and the corresponding aspherical data are shown in FIG. 17. The lateral aberration diagram according to this Example is shown in FIG. 28, the field curvature diagram according to this Example is shown in FIG. 38, and the axial chromatic aberration diagram according to this Example is shown in FIG. 48.

Example 7

Figure 9:
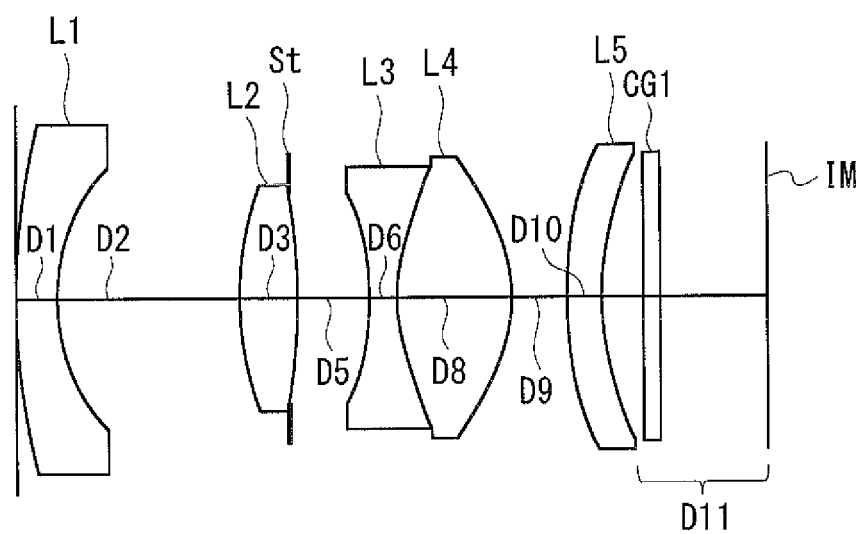
FIG. 9 is a cross-sectional view showing a lens configuration of an imaging lens system according to Example 7 of the present invention.
Figure 29:
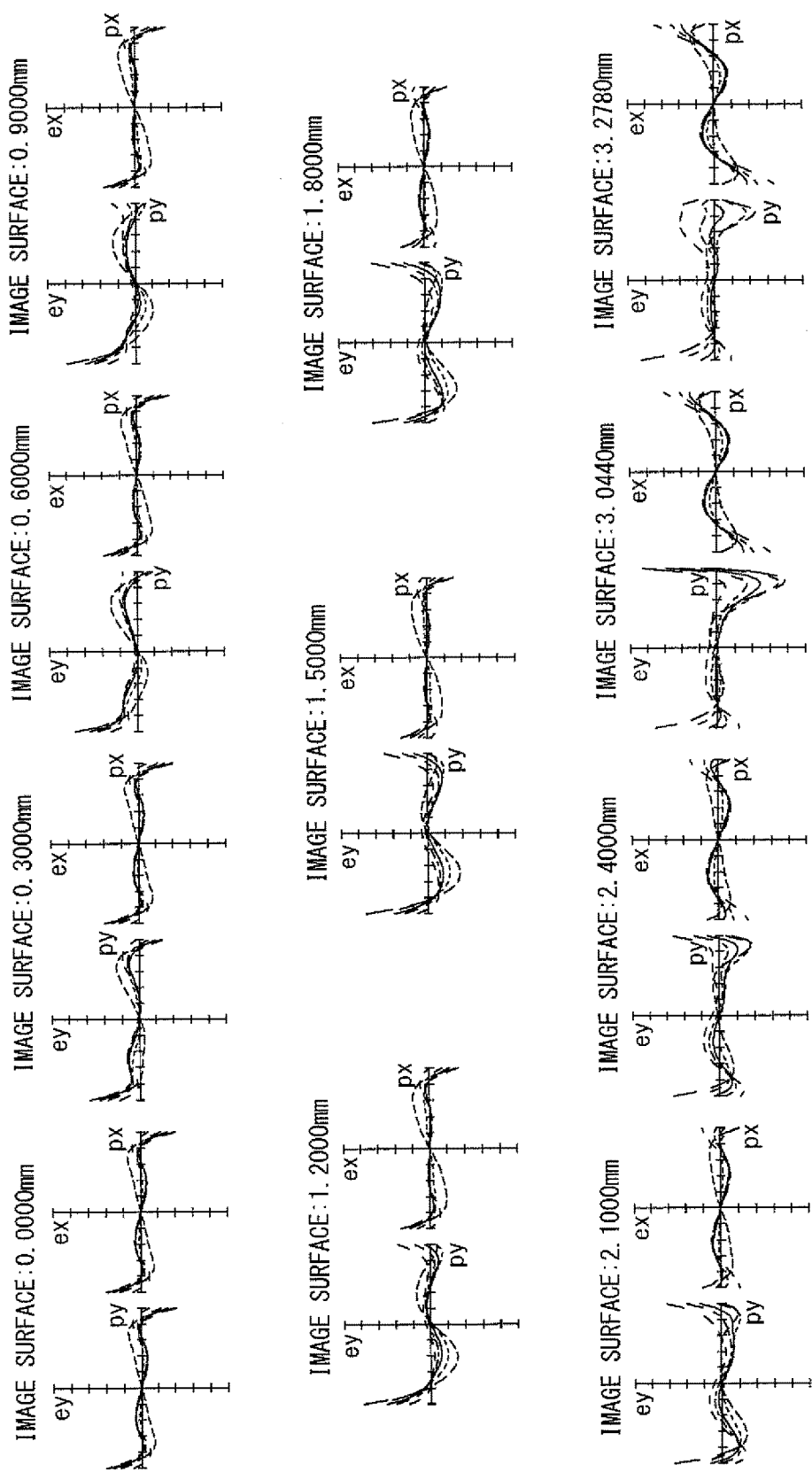
FIG. 29 is a lateral aberration diagram of the imaging lens system according to the Example 7 of the present invention.
Figure 39:
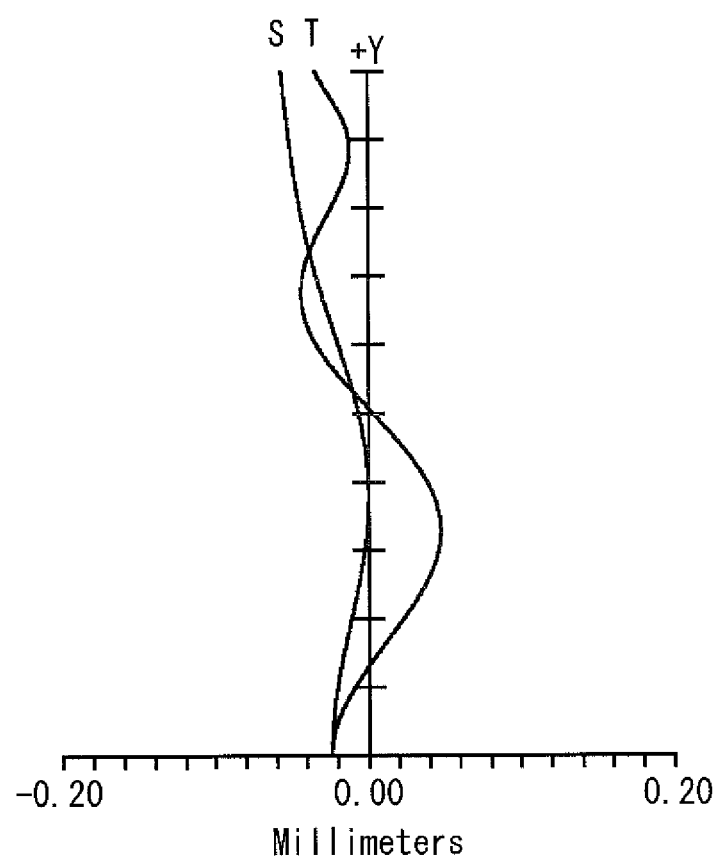
FIG. 39 is a field curvature diagram of the imaging lens system according to the Example 7 of the present invention.
Figure 49:
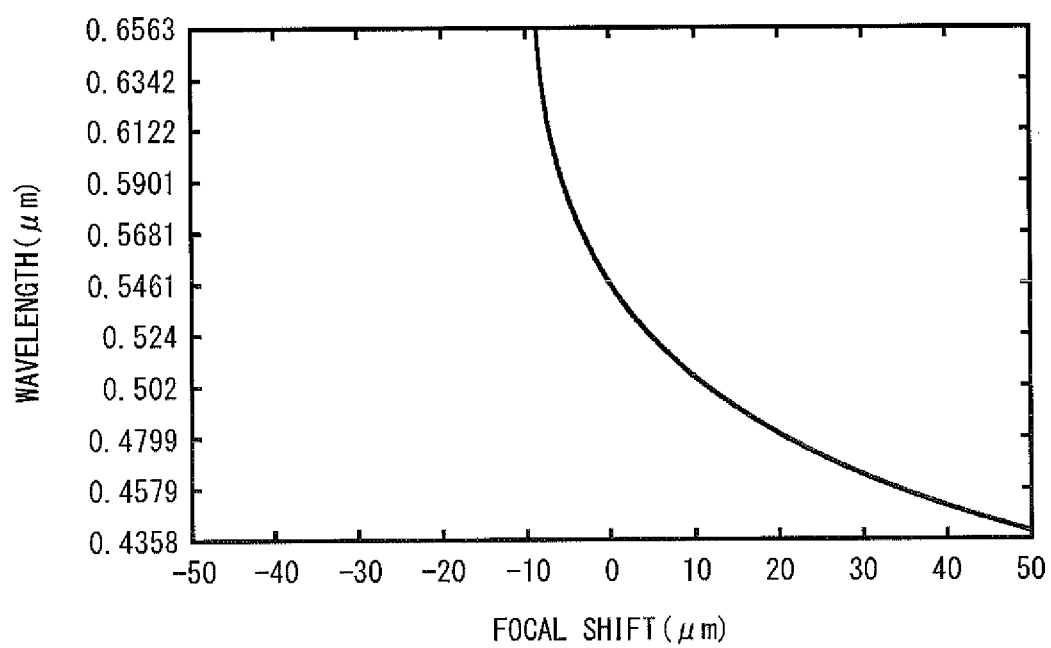
FIG. 49 is an axial chromatic aberration diagram of the imaging lens system according to the Example 7 of the present invention.

The configuration of an imaging lens system 1 according to Example 7 is shown in FIG. 9. The corresponding basic lens data and the corresponding aspherical data are shown in FIG. 18. The lateral aberration diagram according to this Example is shown in FIG. 29, the field curvature diagram according to this Example is shown in FIG. 39, and the axial chromatic aberration diagram according to this Example is shown in FIG. 49.

Example 8

Figure 10:
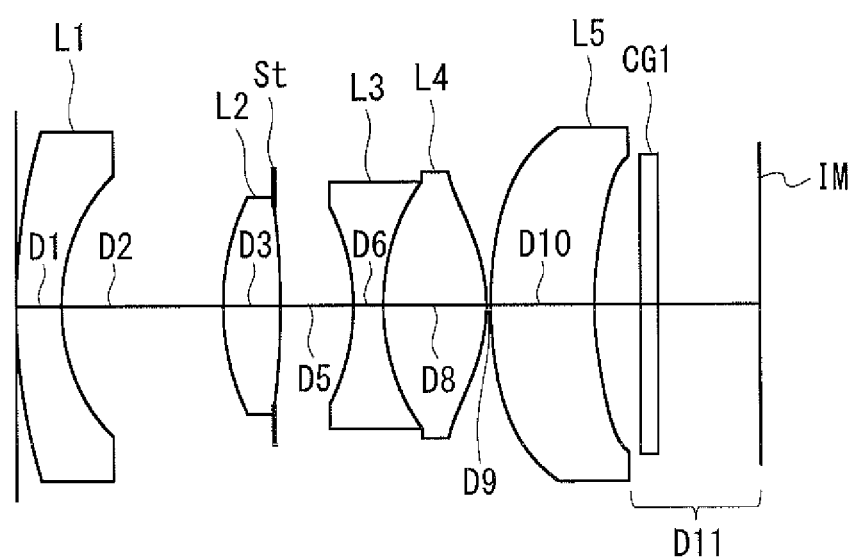
FIG. 10 is a cross-sectional view showing a lens configuration of an imaging lens system according to Example 8 of the present invention.
Figure 30:
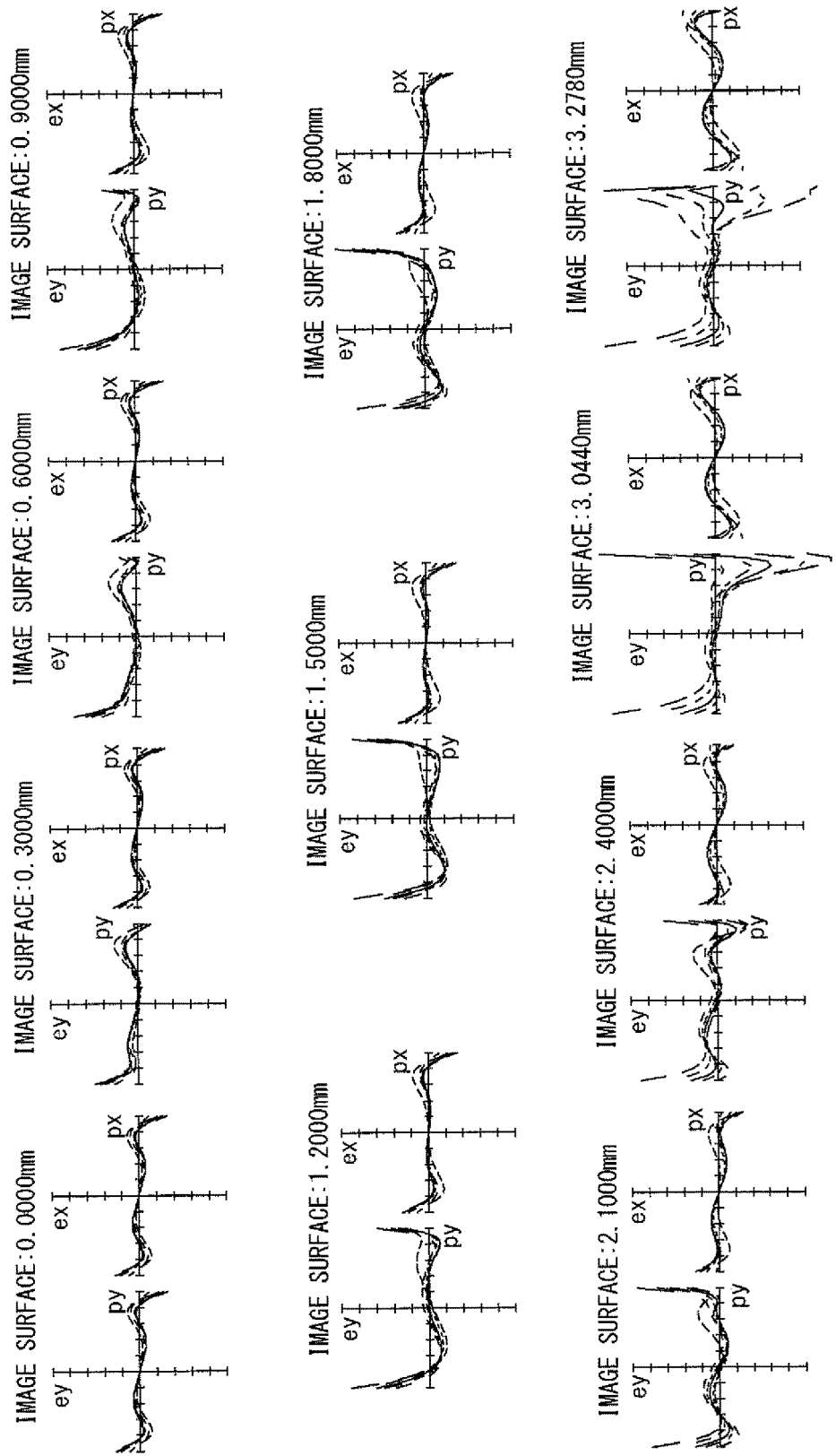
FIG. 30 is a lateral aberration diagram of the imaging lens system according to the Example 8 of the present invention.
Figure 40:
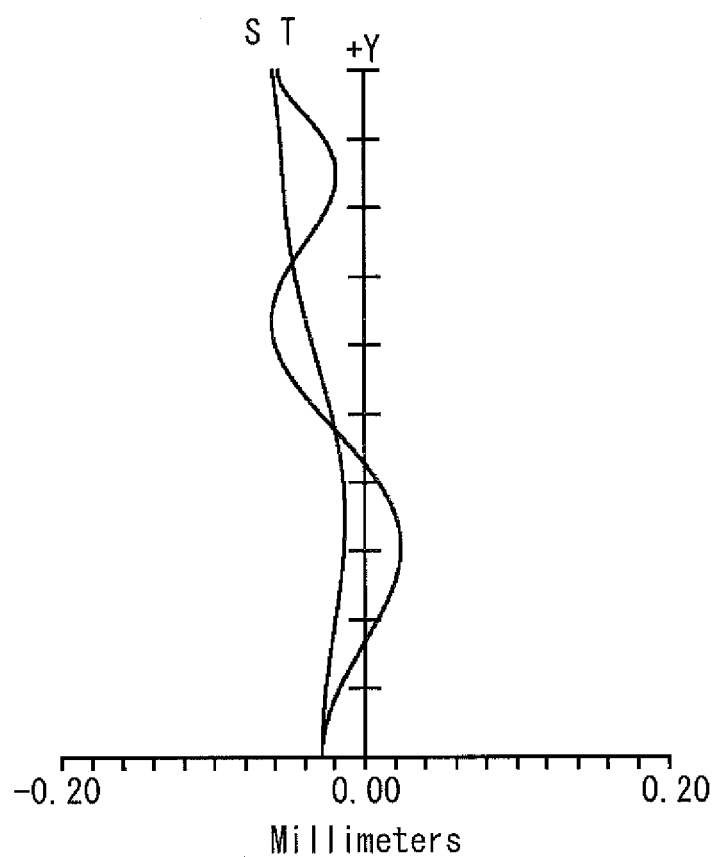
FIG. 40 is a field curvature diagram of the imaging lens system according to the Example 8 of the present invention.
Figure 50:
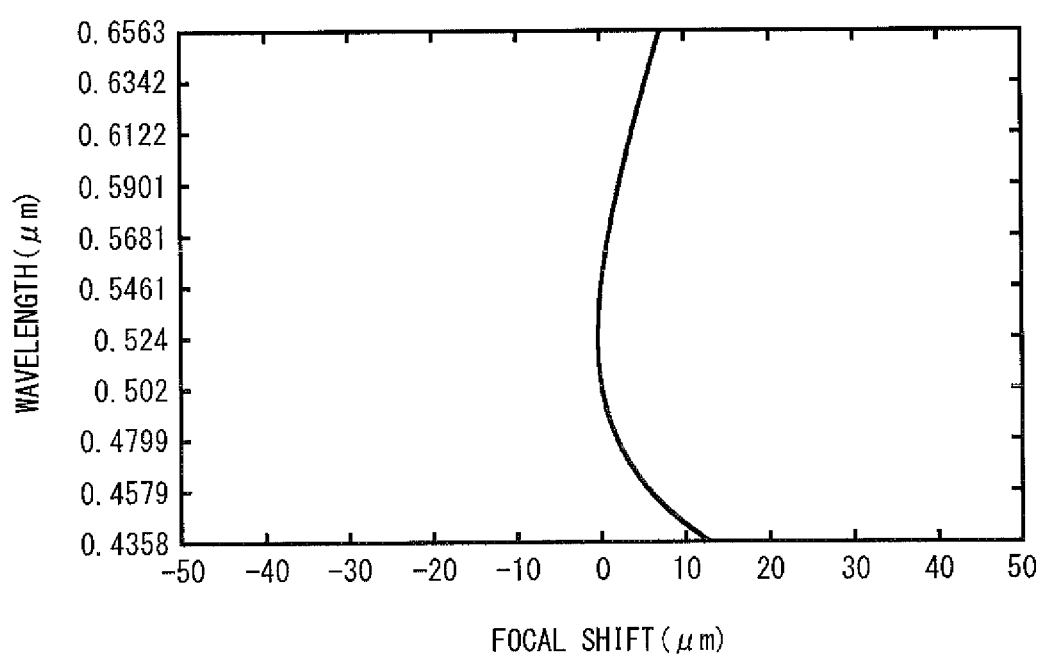
FIG. 50 is an axial chromatic aberration diagram of the imaging lens system according to the Example 8 of the present invention.

The configuration of an imaging lens system 1 according to Example 8 is shown in FIG. 10. The corresponding basic lens data and the corresponding aspherical data are shown in FIG. 19. The lateral aberration diagram according to this Example is shown in FIG. 30, the field curvature diagram according to this Example is shown in FIG. 40, and the axial chromatic aberration diagram according to this Example is shown in FIG. 50.

Example 9

Figure 11:
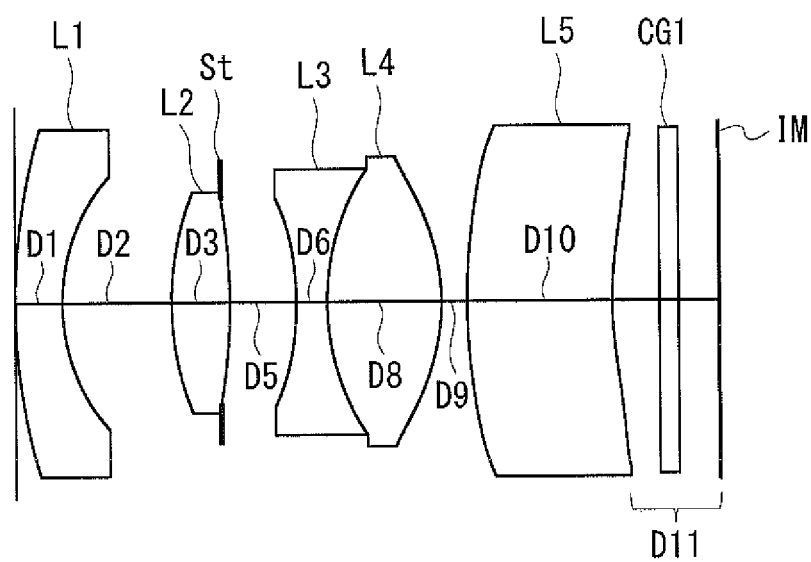
FIG. 11 is a cross-sectional view showing a lens configuration of an imaging lens system according to Example 9 of the present invention.
Figure 31:
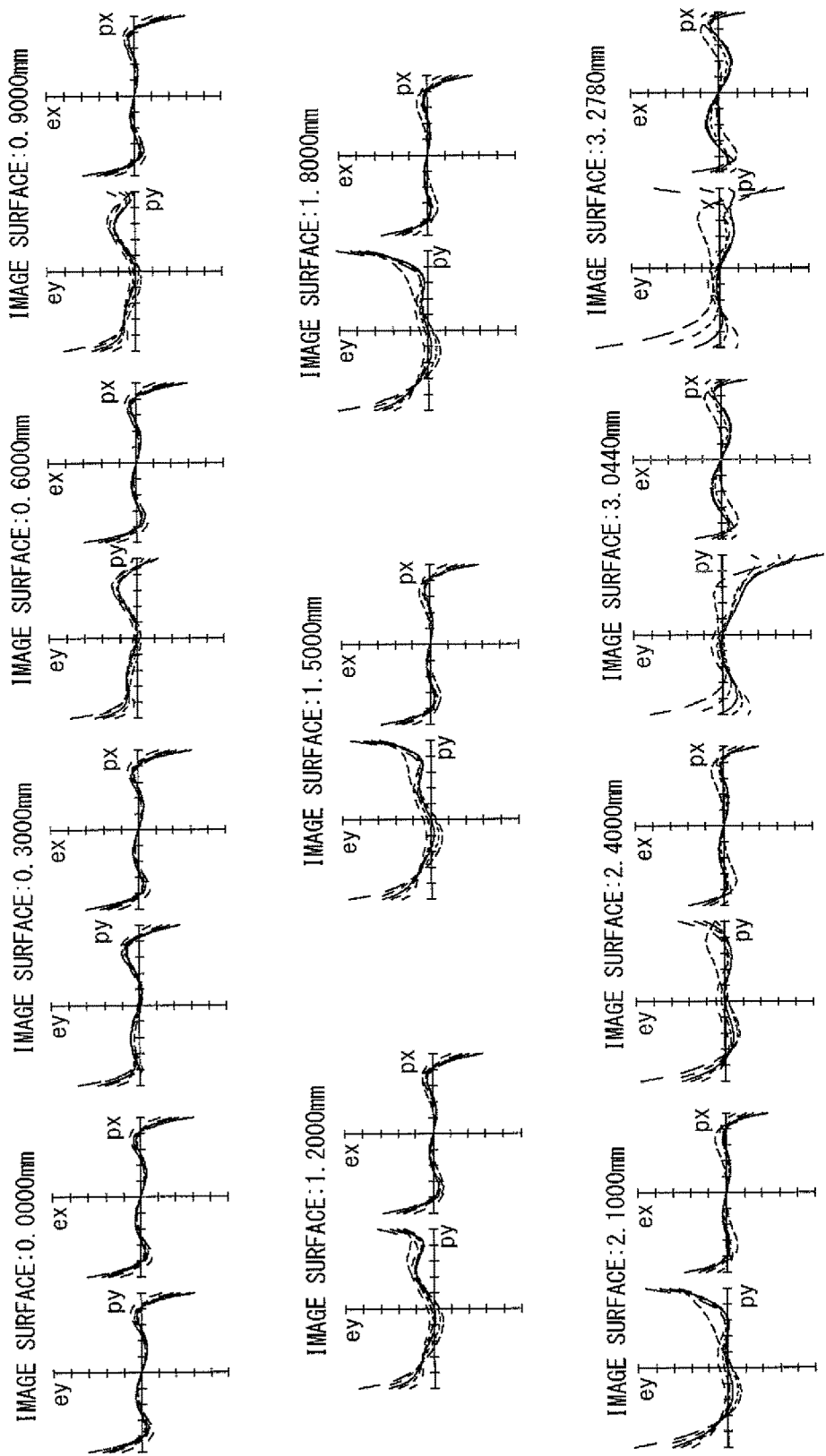
FIG. 31 is a lateral aberration diagram of the imaging lens system according to the Example 9 of the present invention.
Figure 41:
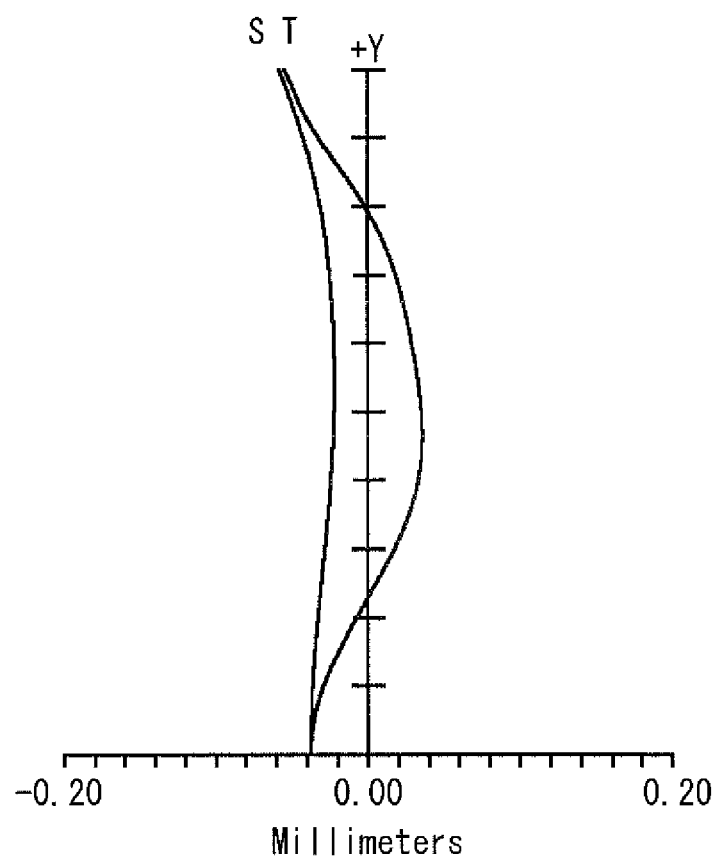
FIG. 41 is a field curvature diagram of the imaging lens system according to the Example 9 of the present invention.
Figure 51:
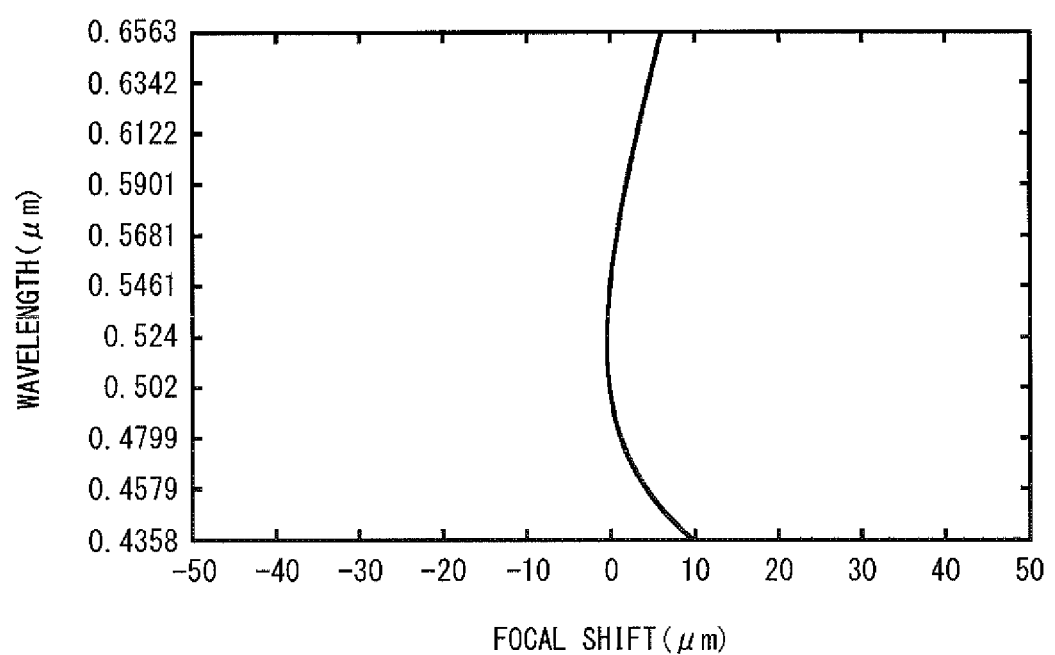
FIG. 51 is an axial chromatic aberration diagram of the imaging lens system according to the Example 9 of the present invention.

The configuration of an imaging lens system 1 according to Example 9 is shown in FIG. 11. The corresponding basic lens data and the corresponding aspherical data are shown in FIG. 20. The lateral aberration diagram according to this Example is shown in FIG. 31, the field curvature diagram according to this Example is shown in FIG. 41, and the axial chromatic aberration diagram according to this Example is shown in FIG. 51.

Comparative Example

Figure 2:
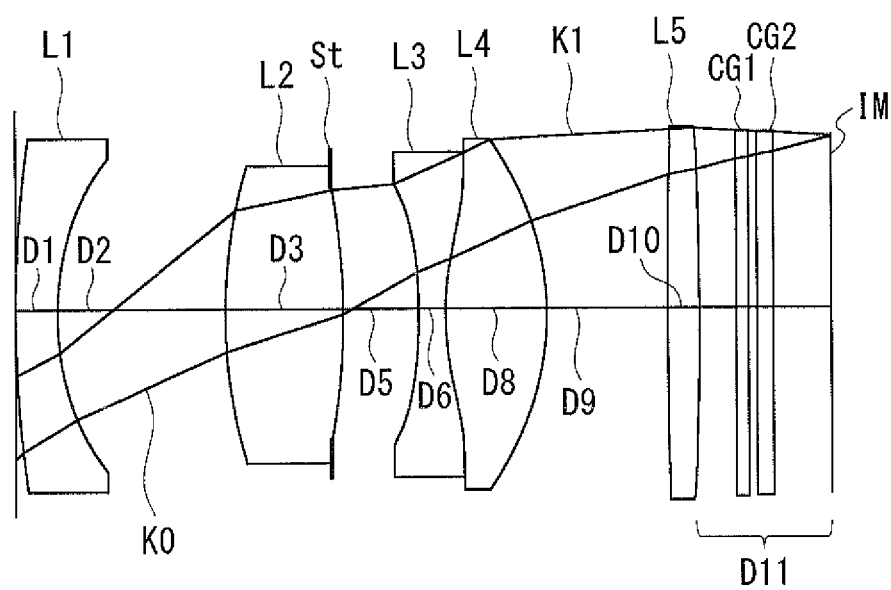
FIG. 2 is a diagram showing a cross section of an imaging lens system and a principal ray and an upper ray at a maximum angle of view according to a comparative example of the present invention.
Figure 32:
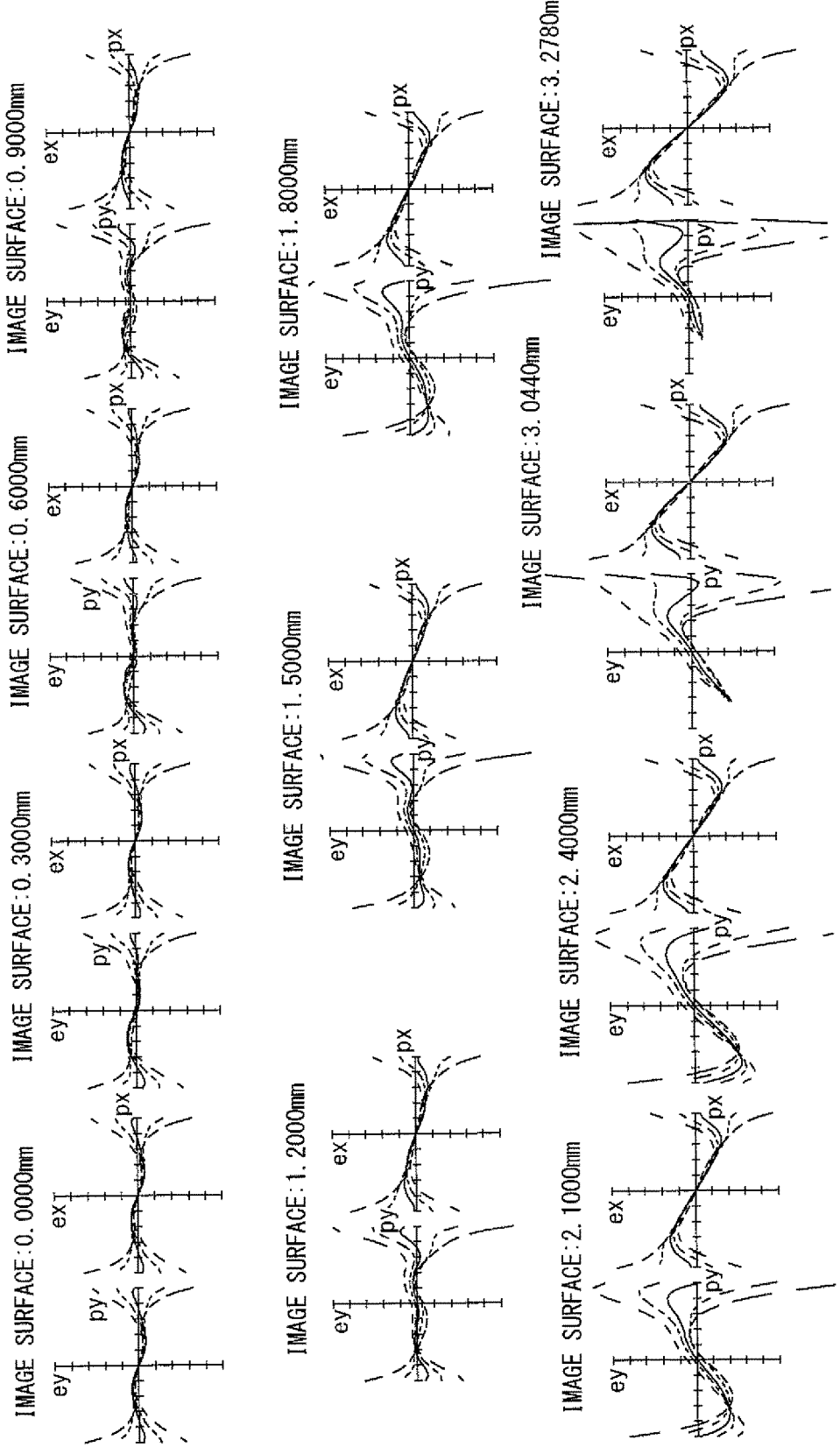
FIG. 32 is a lateral aberration diagram of the imaging lens system according to the comparative example of the present invention.
Figure 42:
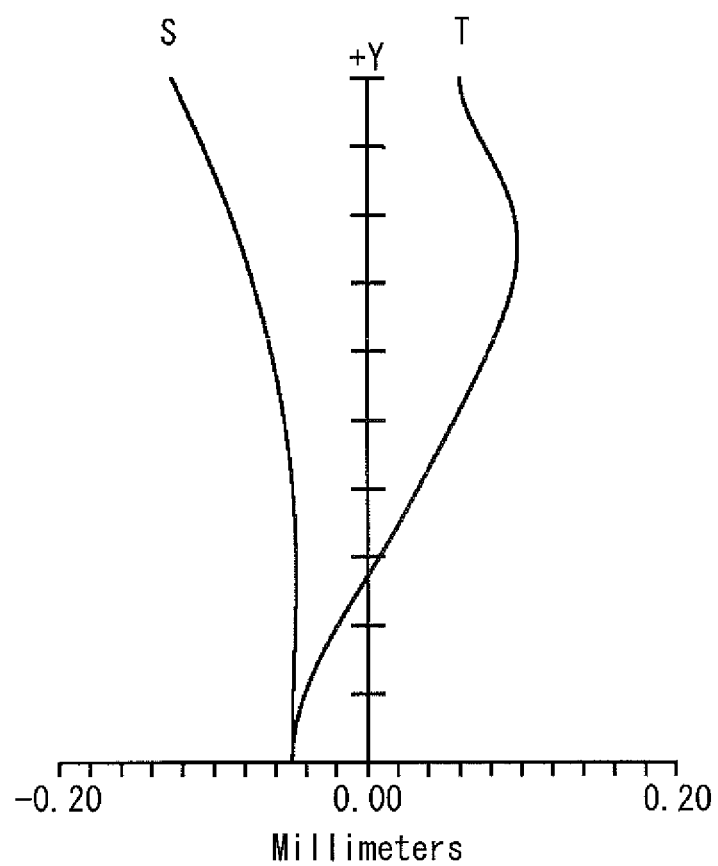
FIG. 42 is a field curvature diagram of the imaging lens system according to the comparative example of the present invention.
Figure 52:
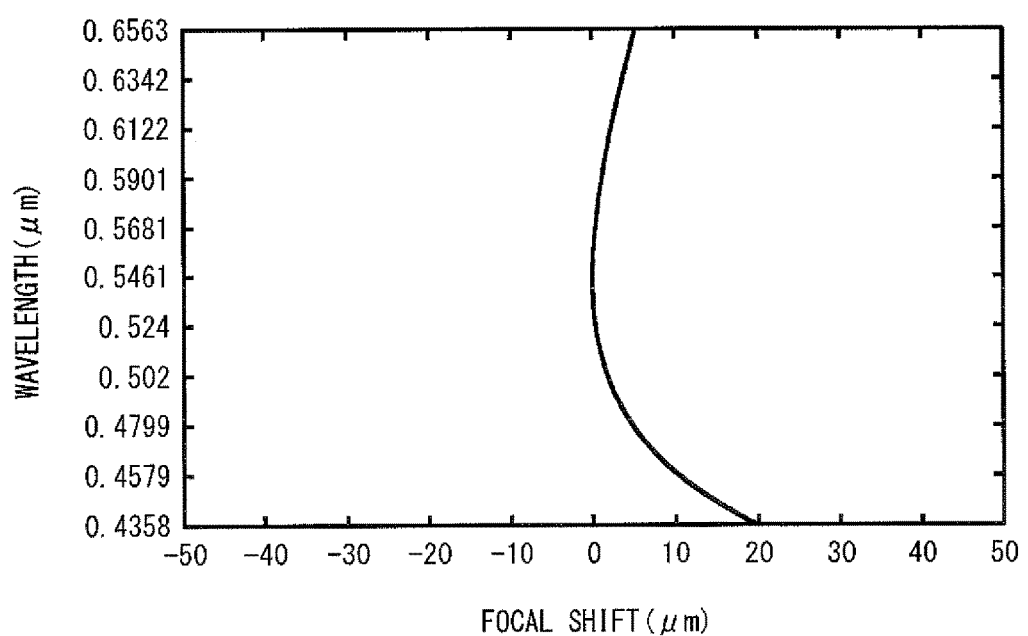
FIG. 52 is an axial chromatic aberration diagram of the imaging lens system according to the comparative example of the present invention.

The configuration of an imaging lens system according to a comparative example is shown in FIG. 2 and FIG. 21 shows the corresponding basic lens data and the corresponding aspherical data. Further, the lateral aberration diagram of this comparative example is shown in FIG. 32, the field curvature diagram thereof is shown in FIG. 42, and the axial chromatic aberration diagram thereof is shown in FIG. 52.

FIG. 2 shows a cross-sectional view of the comparative example of the present invention and shows, similar to FIG. 1, a principal ray K0 at the maximum angle of view and an upper ray K1 at the maximum angle of view passing an edge of the effective diameter of the lenses positioned on the image side with respect to the aperture stop St. While the configurations of the first lens L1 to the fourth lens L4 are the same as those of the imaging lens system 1, the imaging lens system according to the comparative example is different from the imaging lens system 1 according to the embodiment in that the fifth lens L5 is a biconvex positive lens.

[Characteristic Values of Examples and Comparative Example]

FIG. 22 shows the F-value, the focal length f, and the characteristic values of the above conditional expressions (1) to (10) (f1/f to f5/f, FB/f, L4R2D, L5R1D, L5R2R/f, ρ345/ρ12) of the imaging lens system 1 according to the Examples 1 to 9 and the comparative example. FIG. 22 further shows an amount of change in the focal position of the imaging lens system 1 (paraxial focus change amount) when the temperature is changed from a room temperature (25° C.) to 85° C. or −40° C. in the Examples 1 to 9.

As shown in FIG. 22, some of the conditional expressions (1) to (10) may not be satisfied in the Examples 1 to 9. For example, while the conditional expression (1) is satisfied in the Examples 1 to 7, it is not satisfied in the Examples 8 and 9. While the conditional expression (2) is satisfied in the Examples 1 to 8, it is not satisfied in the Example 9. While the conditional expression (3) is satisfied in the Examples 1 to 3 and 5, it is not satisfied in the Examples 4 and 6 to 9. The comparative example does not satisfy the conditional expressions (1), (3), (4), and (10).

In the Examples 1 to 9, the lateral aberration and the field curvature are smaller than those in the comparative example. Further, in the Examples 1 to 3 and 5 that satisfy the conditional expression (3), the axial chromatic aberration is smaller than that in the Examples 4, 6, and 7 that do not satisfy the conditional expression (3). In the Examples 8 and 9, the axial chromatic aberration is equal to that of Examples 1 to 3 and the lateral aberration is somewhat larger than that of the Examples 1 to 3.

Further, as shown in FIG. 22, the amount of change in the focal position of the imaging lens system 1 (paraxial focus change amount) when the temperature is changed from the room temperature (25° C.) to 85° C. or −40° C. in the Examples 1 to 9 is limited to be 0.024 mm or smaller.

The imaging lens system 1 according to the present invention is not limited to those stated in the above Examples and may be changed in various ways.

This application is based upon and claims the benefit of priority from Japanese Patent Application No. 2013-208450, filed on Oct. 3, 2013, the disclosure of which is incorporated herein in its entirety by reference.

REFERENCE SIGNS LIST

1 IMAGING LENS
2 IMAGE PICK-UP DEVICE
Z OPTICAL AXIS
K0 PRINCIPAL RAY AT MAXIMUM ANGLE OF VIEW
K1 UPPER RAY AT MAXIMUM ANGLE OF VIEW
L1 FIRST LENS
L2 SECOND LENS
L3 THIRD LENS
L4 FOURTH LENS
L5 FIFTH LENS
CG1 FIRST COVER GLASS
CG2 SECOND COVER GLASS
St APERTURE STOP
IM IMAGE SURFACE
Si SURFACE NUMBER (i=0, 1, 2, 3, . . . )
Ri RADIUS OF CURVATURE (i=1, 2, 3, . . . ) OF i-TH SURFACE
Di DISTANCE AMONG SURFACES (i=1, 2, 3, . . . ) BETWEEN i-TH SURFACE AND (i+1)-TH SURFACE ON OPTICAL AXIS
Ndi REFRACTIVE INDEX (i=1, 2, 3, . . . ) OF MEDIUM BETWEEN i-TH SURFACE AND (i+1)-TH SURFACE WITH RESPECT TO d-LINE
vdj ABBE NUMBER (j=1, 2, 3, 4, 5) OF MEDIUM OF j-TH LENS

The invention claimed is:

1. An imaging lens system consisting of:
in order from an object side, a first lens made of a negative meniscus lens having a convex surface facing the object side, a second lens made of a positive lens having a convex surface facing the object side, a third lens made of a negative lens having a concave surface facing an image side, a fourth lens made of a positive lens having a convex surface facing the object side, and a fifth lens made of a negative meniscus lens having a concave surface facing the image side, wherein:
an aperture stop is arranged on the object side or the image side of the second lens, and
the lens surface on the image side of the third lens and the lens surface on the object side of the fourth lens are bonded to each other.

2. The imaging lens system according to claim 1, wherein the fifth lens satisfies the following conditional expression:

$$-4 \leq f5/f \leq -1.5$$

where
f is a focal length of the entire lens system; and
f5 is a focal length of the fifth lens.

3. The imaging lens system according to claim 1, wherein the following conditional expression is satisfied:

$$FB/f \geq 0.52$$

where
f is a focal length of the entire lens system; and
FB is an air-equivalent distance from a position that is the closest to the image surface in the outside of the effective diameter of the lens surface on the image side of the fifth lens to the image surface.

4. The imaging lens system according to claim 1, wherein the following conditional expression is satisfied:

$$L4R2D \geq L5R1D$$

where
L4R2D is an effective diameter of the lens surface on the image side of the fourth lens; and
L5R1D is an effective diameter of the lens surface on the object side of the fifth lens.

5. The imaging lens system according to claim 1, wherein the shape of the lens surface on the image side of the fifth lens is a concave shape in a range from an optical axis Z to an edge of the effective diameter and the following conditional expression is satisfied:

$$0.5 \leq L5R2R/f \leq 3$$

where
f is a focal length of the entire lens system; and

L5R2R is a radius of curvature of the lens surface on the image side of the fifth lens.

6. The imaging lens system according to claim 1, wherein the following conditional expression is satisfied:

$$0.36 \leq \rho345/\rho12 \leq 0.52$$

where

ρ12 is a composite power of the first lens and the second lens; and

ρ345 is a composite power of the third lens, the fourth lens, and the fifth lens.

7. The imaging lens system according to claim 1, wherein the material of the third lens, the fourth lens, and the fifth lens is plastic.

8. The imaging lens system according to claim 7, wherein the material of the first lens and the second lens is glass.

9. The imaging lens system according to claim 1, wherein the F-value is smaller than 2.0 and all the following conditional expressions are satisfied:

$$-2.2 \leq f1/f \leq -0.9$$

$$0.5 \leq f2/f \leq 1.6$$

$$-2.8 \leq f3/f \leq -0.5$$

$$0.6 \leq f4/f \leq 1.7$$

where f1 is a focal length of the first lens;
f2 is a focal length of the second lens;
f3 is a focal length of the third lens;
f4 is a focal length of the fourth lens; and
f is a focal length of the entire lens system.

10. The imaging lens system according to claim 1, wherein:

the second lens and the fourth lens are biconvex lenses and the third lens is a biconcave lens, and
the following conditional expression is satisfied:

$$v4-v3 \geq 15$$

where v3 is an Abbe number of the third lens; and
v4 is an Abbe number of the fourth lens.

11. An imaging device comprising:

the imaging lens system according to claim 1;
a planar cover glass arranged on an object side of the imaging lens system; and
an image pick-up device arranged in a focal position of the imaging lens system.

12. An imaging lens system comprising:

in order from an object side, a first lens comprising a negative meniscus lens having a convex surface facing the object side, a second lens comprising a positive lens having a convex surface facing the object side, a third lens comprising a negative lens having a concave surface facing an image side, a fourth lens comprising a positive lens having a convex surface facing the object side, and a fifth lens comprising a meniscus lens having a concave surface facing the image side, wherein:

the imaging lens system further comprises an aperture stop arranged on the object side or the image side of the second lens, and
the lens surface on the image side of the third lens and the lens surface on the object side of the fourth lens are bonded to each other, wherein the following conditional expression is satisfied:

$$L4R2D \geq L5R1D$$

where

L4R2D is an effective diameter of the lens surface on the image side of the fourth lens; and
L5R1D is an effective diameter of the lens surface on the object side of the fifth lens.

13. The imaging lens system according to claim 12, wherein the shape of the lens surface on the image side of the fifth lens does not include an extremum at which a concave shape is changed to a convex shape in a range from an optical axis to an edge of the effective diameter and the following conditional expression is satisfied:

$$0.5 \leq L5R2R/f \leq 3$$

where f is a focal length of the entire lens system; and
L5R2R is a radius of curvature of the lens surface on the image side of the fifth lens.

14. The imaging lens system according to claim 12, wherein the following conditional expression is satisfied:

$$FB/f \geq 0.52$$

where f is a focal length of the entire lens system; and
FB is an air-equivalent distance from a position that is the closest to the image surface in the outside of the effective diameter of the lens surface on the image side of the fifth lens to the image surface.

15. The imaging lens system according to claim 12, wherein the following conditional expression is satisfied:

$$0.36 \leq \rho345/\rho12 \leq 0.52$$

where

ρ12 is a composite power of the first lens and the second lens; and
ρ345 is a composite power of the third lens, the fourth lens, and the fifth lens.

16. The imaging lens system according to claim 12 wherein the material of the third lens, the fourth lens, and the fifth lens is plastic.

17. The imaging lens system according to claim 12, wherein the material of the first lens and the second lens is glass.

18. The imaging lens system according to claim 12, wherein the F-value is smaller than 2.0 and all the following conditional expressions are satisfied:

$$-2.2 \leq f1/f \leq -0.9$$

$$0.5 \leq f2/f \leq 1.6$$

$$-2.8 \leq f3/f \leq -0.5$$

$$0.6 \leq f4/f \leq 1.7$$

where f1 is a focal length of the first lens;
f2 is a focal length of the second lens;
f3 is a focal length of the third lens;
f4 is a focal length of the fourth lens; and
f is a focal length of the entire lens system.

19. The imaging lens system according to claim 12, wherein:

the second lens and the fourth lens are biconvex lenses and the third lens is a biconcave lens, and
the following conditional expression is satisfied:

$$v4-v3 \geq 15$$

where

ν3 is an Abbe number of the third lens; and
ν4 is an Abbe number of the fourth lens.

20. An imaging device comprising:
the imaging lens system according to claim 12;
a planar cover glass arranged on an object side of the imaging lens system; and
an image pick-up device arranged in a focal position of the imaging lens system.

\* \* \* \* \*